US008549036B2

(12) United States Patent
O'Connor et al.

(10) Patent No.: US 8,549,036 B2
(45) Date of Patent: Oct. 1, 2013

(54) INFORMATION TECHNOLOGY ENTERPRISE MANAGER AND PRODUCT PORTFOLIO MANAGER APPLICATION MODULE

(75) Inventors: Stephen J. O'Connor, Pleasanton, CA (US); Thomas M. Niermann, Los Altos, CA (US)

(73) Assignee: Bladelogic, Inc., Houston, TX (US)

( * ) Notice: Subject to any disclaimer, the term of this patent is extended or adjusted under 35 U.S.C. 154(b) by 2066 days.

(21) Appl. No.: 10/745,837

(22) Filed: Dec. 22, 2003

(65) Prior Publication Data

US 2005/0137920 A1    Jun. 23, 2005

(51) Int. Cl.
G06F 7/00    (2006.01)
G06F 17/30    (2006.01)

(52) U.S. Cl.
USPC ........................... 707/776; 707/603; 707/805

(58) Field of Classification Search
USPC .............. 705/1, 7, 36; 707/1, 102, 776, 603, 707/805
See application file for complete search history.

(56) References Cited

U.S. PATENT DOCUMENTS

| | | | | |
|---|---|---|---|---|
| 6,442,557 | B1* | 8/2002 | Buteau et al. | 707/102 |
| 7,149,698 | B2* | 12/2006 | Guheen et al. | 705/1 |
| 7,353,212 | B1* | 4/2008 | Darcy et al. | 705/400 |
| 7,430,562 | B1 | 9/2008 | Bedell et al. | |
| 2002/0174049 | A1* | 11/2002 | Kitahara | 705/36 |
| 2003/0135399 | A1* | 7/2003 | Ahamparam et al. | 705/7 |
| 2004/0119752 | A1* | 6/2004 | Beringer et al. | 345/779 |
| 2004/0143477 | A1* | 7/2004 | Wolff | 705/9 |
| 2005/0044099 | A1* | 2/2005 | Soares et al. | 707/102 |
| 2005/0060662 | A1 | 3/2005 | Soares et al. | |
| 2005/0080502 | A1* | 4/2005 | Chernyak et al. | 700/97 |
| 2005/0138074 | A1 | 6/2005 | O'Connor et al. | |

OTHER PUBLICATIONS

"Final Office Action Mailed Aug. 10, 2007 in U.S. Appl. No. 10/745,892", FOAR,26 pgs.
"USPTO Examiner's Office Action mailed May 21, 2007 in U.S. Appl. No. 10/745,737", 31 pages.
"ITM CIO Success Guide", *ITM Software*, (2003), 2 pgs.
"ITM Software Corporate Overview", *ITM Software*, (2003), 2 pgs.
"ITM Software Foundation—Managing the Business of Information Technology", *ITM Software*, (2003), 4 pgs.
"ITM Software Services", *ITM Software*, (2003), 2 pgs.
"Project Portfolio Management Application Module", *ITM Software*, (2003), 4 pgs.
Office Action for U.S. Appl. No. 11/939,391 dated Jun. 7, 2013, 17 pages.

* cited by examiner

*Primary Examiner* — Shew-Fen Lin

(57) ABSTRACT

This document discusses, among other things, an information technology (IT) enterprise manager system. In one example, the system includes data groups organized into IT Services, IT Resources, and IT Consumers data groups. The IT Resources data group may include one or more of an IT Applications data group, an IT Assets data group, an IT Staff Data group, and an IT Vendors data group. The IT Consumers data group may include one or both of a Business Processes data group and an IT Clients data group. Information in one data group may use a link to other information in another data group. In one example, the system provides tools and methods for managing a portfolio IT projects through various phases of their lifecycles, such as during project definition, establishing a business case for the project, project design and implementation, and/or project wrap-up. For example, the system may provide user interface displays and report generation that permit the user to compare different projects, such as using business value, probability of success and/or other factors for performing the comparison.

50 Claims, 46 Drawing Sheets

500

ITM...

Click to add an Application.
Click to edit this Application.
Click to delete this Application.
Click to display the Applications Inventory.

| Home | Log Out |

Modules
Project Portfolio Management
» Projects
» Prioritization
» Analysis

Foundation
Applications
Assets
Business Processes
Clients
IT Staff
IT Services
Vendors

Resources
Reports
User Guide

Application Details: Accounts Payable

[New] [Edit] [Delete]                                                                    Applications ID: AP_86
Description: Corporations Accounts Payable Application
Vendor: Oracle
Application Status: End Of Life

Instances [New]

| Name | Location | Release Version | Expected Start Date | Expected End Date | Actions |
|---|---|---|---|---|---|
| Accounts Payable Instance #1 | North America | 1.0 | June 01, 2002 | June 30, 2006 | [Edit] [Delete] |

Click to add an Instance for this Application.
Click to edit the Application Instance in the this row.
Click to delete the Application Instance in this row.

| ITM | New Application Instance for Application: Accounts Payable |

Name*
Location
Release Version
Linked Interface Instances [Edit...]
Business Owners [Edit...]
Executive Sponsors [Edit...]
IT Staff [Edit...]
Organizational Units [Edit...]
Business Processes [Edit...]
Assets [Edit...]
Expected Start Date
(mm/dd/yyyy)
Expected End Date
(mm/dd/yyyy)

* Denotes fields that cannot be left blank

[ Save and Done ] [ Save and New ] [ Cancel ]

ITM...

Click to add an Application Instance.
Click to edit this Application Instance.
Click to delete this Application Instance.
Click to display the Applications Inventory.

| Home | Log Out |

Modules
Project Portfolio Management
» Projects
» Prioritization
» Analysis

Foundation
Applications
Assets
Business Processes
Clients
IT Staff
IT Services
Vendors

Resources
Reports
User Guide

Application Instance Details: Accounts Payable Instance #1

New  Edit  Delete                                                   Applications

- ID: AI_86
- Application: Accounts Payable
- Location: North America
- Release Version: 1.0
- Linked Interface Instances:
- Business Owners:
- Executive Sponsors:
- IT Staff:
- Organizational Units: Finance
- Business Processes: Fin-Accounts Payable Process
- Assets:
- Expected Start Date: 06/01/2002
- Expected End Date: 06/30/2006

FIG. 7

Application Interface Details: OE-AR Interface

[New] [Edit] [Delete]   Application Interfaces

ID: Not Defined
Description: Corporations Order Entry and Accounts Receivable Interface
Vendor: Oracle

Application Interface Instances [New]

| Name | Location | Release Version | Expected Start Date | Expected End Date | Actions |
|---|---|---|---|---|---|
| OE-AR Interface #2 | France | 1.0 | | | [Edit] [Delete] |
| OE-AR Interface Instance #1 | North America | 1.0 | September 01, 2002 | September 01, 2002 | [Edit] [Delete] |

Click to add an Application Interface.
Click to edit this Application Interface.
Click to delete this Application Interface.
Click to display the list of Applications Interfaces.
Click to add an Instance for this Application Interface.
Click to edit the Application Interface Instance in this row.
Click to delete the Application Interface Instance in this row.

Modules
Project Portfolio Management
» Projects
» Prioritization
» Analysis

Foundation
Applications
Assets
Business Processes
Clients
IT Staff
IT Services
Vendors Resources
Reports
User Guide

Click to add an Application Interface Instance.

Click to edit this Application Interface Instance.

Click to delete this Application Interface Instance.

Click to display the list of Application Interfaces.

1000

ITM....

| Home | Log Out |

Modules
Project Portfolio Management
» Projects
» Prioritization
» Analysis

Foundation
Applications
Assets
Business Processes
Clients
IT Staff
IT Services
Vendors

Resources
Reports
User Guide

Application Interface Instance Details: OE-AR Interface #2

[New] [Edit] [Delete]                                         Application Interfaces

ID: II_63
Application Interface: OE-AR Interface
Location: France
Release Version: 1.0
Linked Application Instances:
Business Owners: Nance, Carole
Executive Sponsors: Hacker, Paul
IT Staff: Owen, Cramer
        Teer, Ron
Organizational Units: Accounts Receivable
        Sales Operations
Assets:
Expected Start Date:
Expected End Date:

Click to add an Asset.

Click to delete the Asset in this row.
Click to edit the Asset in this row.

ITM....

Home | Log Out

| Modules | Assets | | | |
|---|---|---|---|---|
| Project Portfolio Management | Assets New | | Viewing Items: 1-25 of 204 | |
| » Projects | Name | Description | | Actions |
| » Prioritization | AES-IIS-JPCS | Email Server | | [Edit] [Delete] |
| » Analysis | AMS1DIS1 | Network Server | | [Edit] [Delete] |
| Foundation | AMS1NT1 | Network Server | | [Edit] [Delete] |
| Applications | ATL1NT1 | Web Server | | [Edit] [Delete] |
| Assets | ATL2NT1 | Email Server | | [Edit] [Delete] |
| Business Processes | Batfink | Email Server | | [Edit] [Delete] |
| Clients | BNA1DIS1 | Network Server | | [Edit] [Delete] |
| IT Staff | BNA1FP1 | Network Server | | [Edit] [Delete] |
| IT Services | BNA1FP2 | Network Server | | [Edit] [Delete] |
| Vendors | BNA1FP3 | Email Server | | [Edit] [Delete] |
| Resources | BNA1INFO1 | Email Server | | [Edit] [Delete] |
| Reports | BNA1NT1 | Network Server | | [Edit] [Delete] |
| User Guide | BNA1NT2 | Web Server | | [Edit] [Delete] |
| | BOS1APPS1 | Email Server | | [Edit] [Delete] |

ITM...

| | | | Home | Log Out |
|---|---|---|---|---|

Modules
- Project Portfolio Management
- › Projects
- › Prioritization
- › Analysis

Foundation
- Applications
- Assets
- Business Processes
- Clients
- IT Staff
- IT Services
- Vendors

Resources
- Reports
- User Guide

Business Processes

Business Processes  [New]  [Expand All]  [Expand None]

| Name | Version | Description |
|---|---|---|
| Customer Service Processes | 1.0 | Collection of All Processes used within the Custom... |
| ⊞ Engineering Processes | 1.0 | Collection of All Engineering Processes |
| ⊞ Facilities Processes | 1.0 | Collection of All Facilities Processes |
| ⊞ Finance Processes | 1.0 | Collection of All Finance Processes within the com... |
| ⊞ Human Resource Processes | 1.0 | Collection of All Human Resource Processes within ... |
| ⊞ Information Technology Processes | 1.0 | Collection of the companies Information Technology... |
| Legal | 1.0 | Collection of the companies legal processes |
| ⊞ Manufacturing Processes | 1.0 | Collection of All Manufacturing Processes |
| ⊟ Marketing Processes | 1.0 | Collection of All Marketing Processes |
|     MP-External Messaging Process | 1.0 | Marketing Process to continuously evaluate, improv... |
|     MP-MRD Process | 1.0 | Marketing Process Gather Customer Requirements for ... |
| ⊞ Professional Services Processes | 1.0 | Collection of All Professional Services Processes ... |
| ⊞ Sales Processes | 1.0 | Collection of All Sales Processes |

- Click to add a Business Process.
- Click to display all the Business Processes.
- Click to display only the top-level Business Processes.
- Click to collapse this Business Process.
- Click to expand this Business Process.

FIG. 13

Click to add an IT Staff Member.

Click to edit information for the IT Staff Member in this row.

2100

ITM...

| | | Home | Log Out |

Modules
Project Portfolio Management
» Projects
» Prioritization
» Analysis

Foundation
Applications
Assets
Business Processes
Clients
IT Staff
IT Services
Vendors

Resources
Reports
User Guide

IT Staff

IT Staff [New] Entries in this list are grouped by 'Last Name' using the letter ranges below

[A][B][C][D][E][F][G][H][I][J][K][L][M][N][O][P][Q][R][S][T][U][V][W][X][Y][Z][*][all]

| Last Name | First Name | Manager | Actions |
|---|---|---|---|
| Baron | Debbie | Moates | [Edit] |
| Bartholomew | Kathie | Shavelson | [Edit] |
| Bavelock | Lisa | Stevens | [Edit] |
| Baylis | Sara | Loftin | [Edit] |
| Beall | Dana | Lynch | [Edit] |
| Bean | Ryen | Binkley-Chavez | [Edit] |
| Beasley | Barb | Guerrero | [Edit] |
| Beason | Travis | Binkley-Chavez | [Edit] |
| Beecher | Jesse | Hemmeter | [Edit] |
| Belanger | Joseph | Hirschman | [Edit] |
| Berry | Victoria | Warbis | [Edit] |
| Bess | James | Patel | [Edit] |
| Binkley-Chavez | Kris A | Carmona | [Edit] |
| Blemker | Wescott L. | Feldman | [Edit] |

FIG. 21

| | | | |
|---|---|---|---|
| ITM.... 2300 | | Home | Log Out |
| Modules | IT Services | | |
| Project Portfolio Management | IT Services [New] | | Viewing Items: 1-25 of 28 |
| » Projects | Name | Description | Actions |
| » Prioritization | App Supt - Incident Response | Application Incident Response Service | [Edit] [Delete] |
| » Analysis | AppDev - Application Upgrade | Applications Development Service to provide an upg... | [Edit] [Delete] |
| Foundation | AppDev - Consulting | Applications Development Service to provide consul... | [Edit] [Delete] |
| Applications | AppDev - Deployments | Application Development Service to Deploy a new Ap... | [Edit] [Delete] |
| Assets | AppDev - Modifications | Applications Development Service to Provide Modifi... | [Edit] [Delete] |
| Business Processes | AppDev - Project Estimation | Application Development Service to determine the ... | [Edit] [Delete] |
| Clients | AppSupt - 24/7 Coverage | Application Support 24/7 Coverage Service | [Edit] [Delete] |
| IT Staff | AppSupt - Bug Fixing | Application Support Bug Fixing Service. | [Edit] [Delete] |
| IT Services | AppSupt - Consulting | Application Support Consulting Services | [Edit] [Delete] |
| Vendors | AppSupt - Development Projects to Produc | Application Support Service to assume responsibil... | [Edit] [Delete] |
| Resources | AppSupt - Enhancements | Application Support Enhancement Request Management... | [Edit] [Delete] |
| Reports | DCO - Backup & Recovery Service | Data Center Backup and Recovery Service | [Edit] [Delete] |
| User Guide | | | |

Click to add an IT Service.
Click to delete the IT Service in this row.
Click to edit the IT Service in this row.

Click to add a Vendor.

Click to delete the Vendor in this row.

Click to edit the Vendor in this row.

ITM....

| Home | Log Out |

Modules
Project Portfolio Management
» Projects
» Prioritization
» Analysis

Foundation
Applications
Assets
Business Processes
Clients
IT Staff
IT Services
Vendors

Resources
Reports
User Guide

Vendors

| Vendors New | | | Viewing Items: 1-25 of 27 |
|---|---|---|---|
| Name | Status | Types | Actions |
| Adobe | | | [Edit] [Delete] |
| AT&T | | | [Edit] [Delete] |
| Autodesk | | | [Edit] [Delete] |
| AVP | | | [Edit] [Delete] |
| Cisco | | | [Edit] [Delete] |
| Clarify | | | [Edit] [Delete] |
| Compaq | | | [Edit] [Delete] |
| Computer Associates | | | [Edit] [Delete] |
| Connected | | | [Edit] [Delete] |
| Dell | | | [Edit] [Delete] |
| Hewlett Packard | | | [Edit] [Delete] |
| I2 | | | [Edit] [Delete] |
| IBM | | | [Edit] [Delete] |
| In-House | | | [Edit] [Delete] |
| MCI Worldcom | | | [Edit] [Delete] |
| MfgPro | | | [Edit] [Delete] |

Click to create a new Project.
Click to edit the Project Request.
Click to delete this Project.
Click to display all details of this Project.

ITM — 3100 — Home / Log Out

Modules
Project Portfolio Management
» Projects
» Prioritization
» Analysis

Foundation
Applications
Assets
Business Processes
Clients
IT Staff
IT Services
Vendors Resources
Reports
User Guide

Project Details for: AP Matching Enhancement
[Create New Project] [Delete This Project] — 3112    View Details

Project Request [Edit]

| | | | |
|---|---|---|---|
| Requested By: | Aaron, Tammy | Project Needed By: | 02/13/2003 |
| Created By: | Abbott, Mike | Created On: | 02/09/2003 10:26:48 AM (PST) |
| Last Updated By: | Abbott, Mike | Last Updated On: | 07/08/2003 09:07:21 AM (PDT) |
| State: | Active | Importance: | Immediate/Urgent |
| Organizational Units: | Accounts Payable | | |
| Description: | AP Matching routine has a bug. Oracle has provided a bug fix. Test the patch and then install the patch into production. | | |

3102

3114, 3116, 3118, 3120

| Definition | Business Case | Design and Implement | Wrap-up |
|---|---|---|---|
| Done | Done | Done | Done |
| ☑ Define Initial Scope | ☑ Alignment | ☑ Schedule | ☐ Client Feedback |
| ☑ Identify Stakeholders | ☑ Expected Value | ☑ Allocate Resources | ☐ IT Lessons Learned |
| | ☑ Cost/Benefit | | |
| | ☑ Approval | | |

3104

Attachments [Add]

| Name | Created By | Size | Actions |
|---|---|---|---|
| No items found | | | |

3106

Links [Add]

| Name | Location URL | | Actions |
|---|---|---|---|
| No items found | | | |

3108

3110

Project Summary Information
Priority Summary - View current priorities set for this Project in various Organizational Units
Impact Summary - View a list of items impacted by this Project Top of Page

3300

Click to complete or edit the Expected Value questionnaire.

ITM...

Home | Log Out

Modules
Project Portfolio Management
» Projects
» Prioritization
» Analysis

Foundation
Applications
Assets
Business Processes
Clients
IT Staff
IT Services
Vendors

Resources
Reports
User Guide

Project Details for : AP Matching Enhancement

[Create New Project] [Delete This Project]   View Details

Definition > Business Case · Design and Implement   Wrap-up

| Alignment | Expected Value [Edit] | Cost/Benefit | Approval |

Business Value Questions

How many organization objectives does this project support?
✔ 1
  2
  3+

Will this project enable new functionality that creates a competitive advantage for the company?
  Yes
✔ No Will this project directly impact/improve customer satisfaction?
  Yes
✔ No Is this project being driven by changes required by the vendor to maintain support or mandatory changes such as new legal or financial?
  Yes
✔ No Is this project driving cost savings versus the current solution?
  Yes
✔ No If driving cost savings, how much savings versus current solution?
✔ Less than 5%
  Less than 25%
  More than 25%

Probability of Success Questions

What percentage of employees are being impacted by this project?
✔ Less than 5%
  Less than 10%
  Greater than 20%
  Greater than 50%

How many external parties/organizations are impacted by this project?
✔ 0-1
  2-3
  4+

FIG. 33

Click to add a line item budget.

Click to display all expenditure line items for this Project.

Click to display only the categories, and the subtotals and totals by quarter.

Home | Log Out

Project Details for: Documentation Project

[Create New Project] [Delete This Project]　　　　　　　　　　　　　　　View Details

Definition ▸ Business Case ▸ Design and Implement ▸ Wrap-up

3400

Alignment | Expected Value | Budget | Benefit | Approval

Budget Details [Add] [Expand All] [Collapse All]

| Name | Actions | Q4 FY2003 | | Q4 FY2003 | | Q1 FY2004 | | Q3 FY2004 | | Total | |
|---|---|---|---|---|---|---|---|---|---|---|---|
| | | Capital | Expense | Capital | Expense | Capital | Expense | Capital | Expense | Capital | Expense |
| ⊟ Hardware | | | | | | | | | | | |
| Desktop Computer | [Edit][Delete] | $1,000.00 | $200.00 | $0.00 | $200.00 | $0.00 | $200.00 | $0.00 | $400.00 | $1,000.00 | $1,000.00 |
| Workstation | [Edit][Delete] | $10,000.00 | $1,000.00 | $0.00 | $1,000.00 | $0.00 | $1,000.00 | $0.00 | $1,000.00 | $10,000.00 | $4,000.00 |
| Subtotal | | $11,000.00 | $1,200.00 | $0.00 | $1,200.00 | $0.00 | $1,200.00 | $0.00 | $1,400.00 | $11,000.00 | $5,000.00 |
| ⊞ Software | | | | | | | | | | | |
| Subtotal | | $700.00 | $700.00 | $0.00 | $0.00 | $0.00 | $0.00 | $0.00 | $0.00 | $700.00 | $700.00 |
| | Total | $11,700.00 | $1,900.00 | $0.00 | $1,200.00 | $0.00 | $1,200.00 | $0.00 | $1,400.00 | $11,700.00 | $5,700.00 |

Return to Project Summary Page

Click to delete this line item (budget and actuals).

Click to edit this line item budget.

Click to access details for this line item.

Click to expand this category.

Click to collapse this category.

FIG. 34

Click to add a benefit line item
— Click to display all benefit line items for this Project.
— Click to display only the categories, and the subtotals and totals by quarter.

| Home | Log Out |

Project Details for: Documentation Project

[Create New Project] [Delete This Project]          View Details

Definition ▶ Business Case ▶ Design and Implement ▶ Wrap-up

| Alignment | Expected Value | Budget | Benefit | Approval |

3500

Benefit Details [Add] [Expand All] [Collapse All]

| Name | Actions | Q4 FY2003 | Q1 FY2004 | Total |
|---|---|---|---|---|
| ⊟ Tangible | | | | |
| Benefit One | [Edit] [Delete] | $2,000.00 | $1,000.00 | $3,000.00 |
| Subtotal | | $2,000.00 | $1,000.00 | $3,000.00 |
| ⊟ Intangible | | | | |
| Subtotal | | $0.00 | $0.00 | $0.00 |
| | Total | $2,000.00 | $1,000.00 | $3,000.00 |

Return on Investment [    ] % [Save]

Return to Project Summary Page

— Click to delete this benefit line item.
— Click to edit this benefit line item.
Click to access details for this line item.
Click to expand this category.
Click to collapse this category.

FIG. 35

Click to enter or edit Approval information.

ITM...

Home | Log Out

| Modules |
|---|
| Project Portfolio Management |
| » Projects |
| » Prioritization |
| » Analysis |
| Foundation |
| Applications |
| Assets |
| Business Processes |
| Clients |
| IT Staff |
| IT Services |
| Vendors |
| Resources |
| Reports |
| User Guide |

Project Details for : AP Matching Enhancement

[Create New Project] [Delete This Project]

View Details

Definition > Business Case > Design and Implement > Wrap-up

3600

Alignment | Expected Value | Cost/Benefit | Approval Edit

| Approval Responses | | | |
|---|---|---|---|
| Approver | Approval Status | Last Updated By | Last Updated Date |
| Odom, Stacey | Approved | Abbott, Mike | 04/16/2003 |
| Obryan, Sean | Approved | Abbott, Mike | 04/16/2003 |
| Oberheim, Darlene | Approved | Abbott, Mike | 04/16/2003 |
| Obara, Calvin | Approved | Abbott, Mike | 04/16/2003 |

To modify the list of approvers for this Project, click here.

Return to Project Summary Page

FIG. 36

Click to enter or edit Schedule information.

ITM...

| Home | Log Out |

Modules
Project Portfolio Management
» Projects
» Prioritization
» Analysis

Foundation
Applications
Assets
Business Processes
Clients
IT Staff
IT Services
Vendors

Resources
Reports
User Guide

Project Details for : AP Matching Enhancement

[Create New Project] [Delete This Project]    View Details

Definition   Business Case   Design and Implement   Wrap-up   3700
3704   3706   3708

Schedule  Edit  Allocate Resources  Actuals
Committed Delivery Date: 04/18/2003      Schedule Health:   Critical
This Project depends on the following Projects:   The following Projects depend on this project:   3702

Project Phases

| Name | Planned Start Date | Planned End Date | Actual Start Date | Actual End Date | Outlook Date |
|---|---|---|---|---|---|
| Evaluation | 02/07/2003 | 02/09/2003 | 04/16/2003 | | 04/18/2003 |
| Scope | 02/07/2003 | 02/09/2003 | 04/16/2003 | | 04/18/2003 |
| Design | 02/07/2003 | 02/09/2003 | 04/16/2003 | | 04/18/2003 |
| Develop | 02/07/2003 | 02/09/2003 | 04/16/2003 | | 04/18/2003 |
| Test | 02/07/2003 | 02/09/2003 | 04/16/2003 | | 04/18/2003 |
| Prep | 02/07/2003 | 02/09/2003 | 04/16/2003 | | 04/18/2003 |
| Go Live | 02/07/2003 | 02/09/2003 | 04/16/2003 | | 04/18/2003 |
| Wrapup | 02/09/2003 | 02/09/2003 | | | 04/18/2003 |

Return to Project Summary Page

FIG. 37

Click to add a line item | — Click to display all expenditure line items for this Project.
actual without a budget.
| — Click to display only the categories, and the subtotals and totals by quarter.

Project Details for : Documentation Project

[Create New Project] [Delete This Project]                                   View Detail Definition    Business Case    Design and Implement    Wrap-up

3900

Schedule    Allocate Resources    Actuals

Actuals Details [Add] [Expand All] [Collapse All]

| Name | Actions | Q4 FY2003 | | Q4 FY2003 | | Q1 FY2004 | | Q3 FY2004 | | Total | |
|---|---|---|---|---|---|---|---|---|---|---|---|
| | | Capital | Expense | Capital | Expense | Capital | Expense | Capital | Expense | Capital | Expense |
| ⊟ Hardware | | | | | | | | | | | |
| Desktop Computer | [Edit][Delete] | $1,000.00 | $0.00 | $0.00 | $0.00 | $0.00 | $0.00 | $0.00 | $0.00 | $1,000.00 | $0.00 |
| Workstation | [Edit][Delete] | $10,000.00 | $1,000.00 | $0.00 | $0.00 | $0.00 | $0.00 | $0.00 | $0.00 | $10,000.00 | $1,000.00 |
| Subtotal | | $11,000.00 | $1,000.00 | $0.00 | $0.00 | $0.00 | $0.00 | $0.00 | $0.00 | $11,000.00 | $1,000.00 |
| ⊞ Software | | | | | | | | | | | |
| Subtotal | | $0.00 | $0.00 | $0.00 | $0.00 | $0.00 | $0.00 | $0.00 | $0.00 | $0.00 | $0.00 |
| | Total | $11,000.00 | $1,000.00 | $0.00 | $0.00 | $0.00 | $0.00 | $0.00 | $0.00 | $11,000.00 | $1,000.00 |

Return to Project Summary Page

— Click to delete this line item (budget and actuals).
— Click to edit this line item actuals.
Click to access details for this line item.
Click to expand this category.
Click to collapse this category.

— Click to enter or edit Client Feedback information.

ITM

| Home | Log Out

Modules
Project Portfolio Management
» Projects
» Prioritization
» Analysis

Foundation
Applications
Assets
Business Processes
Clients
IT Staff
IT Services
Vendors

Resources
Reports
User Guide

Project Details for : AP Matching Enhancement

[Create New Project] [Delete This Project]          View Details

Definition → Business Case → Design and Implement → Wrap-up
4002          4004                                    4006

Client Feedback  [Edit]  IT Lessons Learned

Satisfaction
Are all the teams involved in this project satisfied with the outcome?
✔ Exceeded expectations
  Met expectations
  Met some expectations
  Did not meet expectations
  None of the above

Execution
Did the project meet scheduling milestones and execution goals?
✔ Exceeded expectations
  Met expectations
  Met some expectations
  Did not meet expectations
  None of the above Return to Project Summary Page

Click to enter or edit IT Lessons Learned.

ITM....

| Home | Log Out

Modules
Project Portfolio Management
› Projects
› Prioritization
› Analysis

Foundation
Applications
Assets
Business Processes
Clients
IT Staff
IT Services
Vendors

Resources
Reports
User Guide

Project Details for : AP Matching Enhancement

[Create New Project] [Delete This Project]

View Details

Definition    Business Case    Design and Implement    ▶ Wrap-up

Client Feedback | IT Lessons Learned [Edit]

General Project Issues and Communication

How clearly defined were the objectives for this project?
✔ Very
  Somewhat
  Not very
  Not at all How clearly defined were the objectives for your work?
✔ Very
  Somewhat
  Not very
  Not at all How clear were you on your role in the project?
✔ Very
  Somewhat
  Not very
  Not at all How adequately involved did you feel in project decisions?
✔ Very
  Somewhat
  Not very
  Not at all How efficient and effective were project team meetings?
✔ Very
  Somewhat
  Not very
  Not at all How efficient and effective were technical meetings?
✔ Very
  Somewhat
  Not very
  Not at all

ITM

Project Portfolio Management

Projects | Analysis | Prioritization

Project Priorities | Modify Priorities

Organizational Unit : NewOrganizationalUnit1c [Select] — 4202

[Show All Projects]

| Priority | Expected Value | Name | State | Total Budget Expense | Total Benefit | ROI | Business Value | Needed By Date | Related Links | |
|---|---|---|---|---|---|---|---|---|---|---|
| 1 | | Doc Test | New | | | | | 10/29/2003 | Alignment | Go |
| 2 | | 100603-New-Pro-A | Active | | | | | 10/01/2003 | Alignment | Go |
| 3 | 10.66 | Project1c | Active | $50,033,332.00 | $46,232,322.00 | 30% | 26 | 10/01/2003 | Alignment | Go |

Prioritization Status

Priority order for this Organizational Unit was last updated on 10/06/2003 2:46 PM by MANAGER, ITM.

* For long project lists this action may take a while.

Modules
- Project Portfolio Management
  - Projects
  - Analysis
  - Prioritization

Foundation
- Applications
- Assets
- Business Processes
- Clients
- IT Staff
- IT Services
- Vendors

Resources
- Reports

Click to modify Project priorities.
Click to select an Organizational Unit.
Click to display all Projects in the selected Organizational Unit.
Select a related link and click Go.

FIG. 42

| | | | | | 4300 |
|---|---|---|---|---|---|
| ITM | | | | Home | Log Out |

Priority Summary for : AP Matching Report

Modules
Project Portfolio Management
» Projects
» Prioritization
» Analysis

Foundation
Applications
Assets
Business Processes
Clients
IT Staff
IT Services
Vendors

Resources
Reports
User Guide

| Project Priorities | | | | |
|---|---|---|---|---|
| Actions | Priority | Organizational Unit | Total Projects | Last Updated Time |
| Change | 2 | Accounts Payable | 2 | 02/09/2003 11:01:29 AM (PST) |
| Change | 1 | Finance | 10 | 04/10/2003 10:51:09 AM (PDT) |
| Change | --- | Administration | 41 | 11/20/2002 10:34:32 AM (PST) |
| Change | 6 | ITM Software | 42 | 02/09/2003 11:03:59 AM (PST) |

Return to Project Summary Page

ITM....      New Filter      4500

Click for instructions. — Instructions

[ Save Filter And Apply ] [ Apply Filter ] [ Cancel ]

Filter Name* [ ]      Filter Description [ ]
\* Required only if saving filter     (2000 Chars Max)

--- Basic Filtering Options ---

Organizational Units [ ] [Edit]     States [ ] [Edit]
☐ Include Sub Organizational Units
Schedule Health [ ] [Edit]     Justification Category [ ] [Edit]

--- Cost/Benefit Filtering Options ---

One Time Project Cost between: [ ] and [ ]
Sustaining Costs between: [ ] and [ ]
Total Cost of Ownership between: [ ] and [ ]
Benefit of Ownership between: [ ] and [ ]
Return on Investment between: [ ] and [ ]

--- Alignment Filtering Options ---

Organization Objectives [ ] [Edit]     Assets [ ] [Edit]
Business Processes [ ] [Edit]     IT Services [ ] [Edit]
Application Instances [ ] [Edit]     Regions [ ] [Edit]
Application Interface Instances [ ] [Edit]     Vendors [ ] [Edit]

--- Clients and IT Staff Filtering Options ---

Project Managers [ ] [Edit]     Executive Sponsors [ ] [Edit]
IT Owners [ ] [Edit]     Business Owners [ ] [Edit]
Assigned IT Staff [ ] [Edit]     Assigned Business People [ ] [Edit]

[ Save Filter And Apply ] [ Apply Filter ] [ Cancel ]

INFORMATION TECHNOLOGY ENTERPRISE MANAGER AND PRODUCT PORTFOLIO MANAGER APPLICATION MODULE

CROSS REFERENCE TO RELATED APPLICATIONS

This patent application is related to U.S. patent application Ser. No. 10/745,892, to Steven J. O'Connor and Thomas M. Niermann, filed on even date herewith, which is entitled INFORMATION TECHNOLOGY ENTERPRISE MANAGER.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This patent application pertains generally to enterprise management systems, and more particularly, but not by way of limitation, to an information technology enterprise manager and a product portfolio manager application module.

BACKGROUND

Businesses and other organizations are continuously working to improve their productivity and competitiveness. As part of these efforts, businesses have been increasing the portion of their revenues that they spend on Information Services (IS) and Information Technology (IT), collectively referred to herein as "IT". Many businesses now spend between 4% and 8% of their revenue on IT. However, many businesses are not satisfied with the return on investment (ROI) in IT. Ample evidence exists of instances of IT spending gone awry, with potentially crippling effects on the business organization.

The growing importance of IT to a business's competitive advantage has led some businesses to hire a Chief Information Officer (CIO) or the like to manage the organization's IT needs. Like others in the organization, CIOs are being asked to manage more with less. However, CIOs do not have proper or adequate tools to enable them to successfully manage IT. While other entities within an organization may rely on enterprise management software solutions to assist in managing projects, human resources, etc., such enterprise management solutions are not particularly well adapted to the specific needs and problems associated with management of IT.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 5 is a user interface display screenshot of an example of a Application Details screen.

FIG. 6 is a user interface display screenshot of an example of a New Application Instance screen.

FIG. 7 is a user interface display screenshot of an example of an Application Instance Details screen.

FIG. 9 is a user interface display screenshot of an example of an Application Interface Details screen.

FIG. 10 is a user interface display screenshot of an example of an Application Interface Instance Details screen.

FIG. 11 is a user interface display screenshot example of an Assets screen.

FIG. 13 is a user interface display screenshot illustrating generally an example of a Business Processes screen.

FIG. 21 is a user interface display screenshot of an example of an IT Staff screen.

FIG. 23 is a user interface display screenshot of one example of an IT Services screen.

FIG. 25 is a user interface display screenshot of one example of an IT Vendors screen.

FIG. 31 is a user interface display screenshot illustrating one example of a IT Project Details screen.

FIG. 33 is a block diagram that illustrates a display of an Expected Value screen.

FIG. 34 is a user interface screenshot illustrating an example of a "Budget" screen.

FIG. 35 is a user interface screenshot illustrating an example of a "Benefit" screen.

FIG. 36 is a user interface screenshot illustrating an example of an "Approval" screen.

FIG. 37 is a user interface screenshot illustrating an example of a "Design and Implement" screen.

FIG. 39 is a user interface screenshot that illustrates an "Actuals" screen.

FIG. 40 is a user interface screenshot illustrating an example of a "Wrap-up" screen.

FIG. 41 is a user interface screenshot that illustrates an IT Lessons Learned screen.

FIG. 42 is a user interface screenshot illustrating an example of a PPM screen with a Prioritization screen active.

FIG. 43 is a user interface screenshot illustrating an example of a Priority Summary screen.

FIG. 45 is a user interface screenshot illustrating an example of a "New Filter" screen that permits the user to enter various filtering parameters for filtering IT projects.

DETAILED DESCRIPTION

In the following detailed description, reference is made to the accompanying drawings which form a part hereof, and in which is shown by way of illustration specific embodiments in which the invention may be practiced. These embodiments, which are also referred to herein as "examples," are described in sufficient detail to enable those skilled in the art to practice the invention, and it is to be understood that the embodiments may be combined, or that other embodiments may be utilized and that structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this documents and those documents so incorporated by reference, the usage in the incorporated reference(s) should be considered supplementary to that of this document; for irreconcilable inconsistencies, the usage in this document controls.

1. System Overview

The present inventors have developed, among other things, a platform for supporting IT decisions. The platform includes a comprehensive knowledge base and the tools needed to exploit the knowledge base. The knowledge base has been designed to provide context to the process or IT decision making. The tools leverage the IT knowledge base to address specific IT management challenges. Moreover, the platform and tools lend themselves to implementing a set of "best practices" for managing an organization's IT needs.

Figure 1:
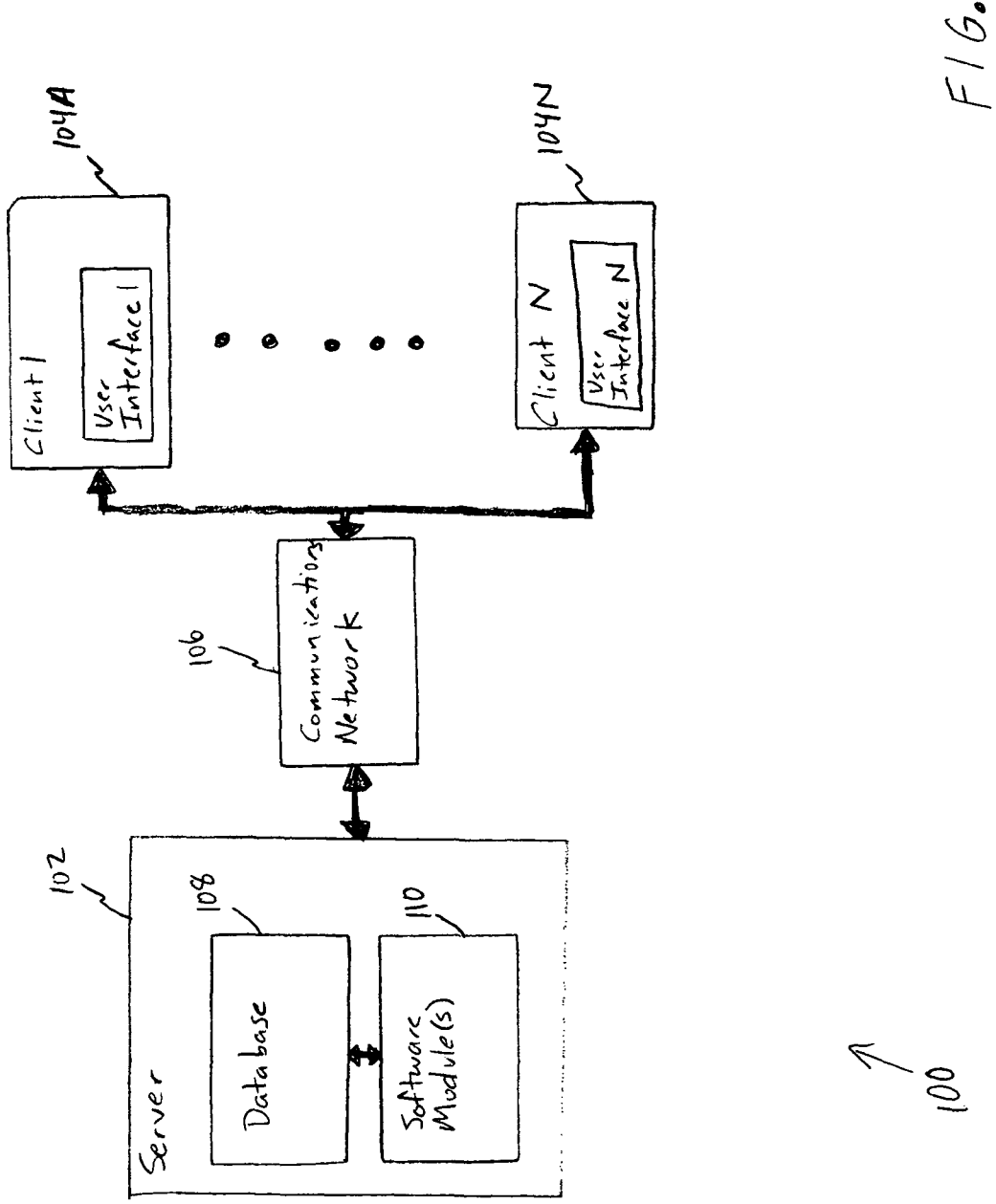
FIG. 1 is a block diagram illustrating generally one example of portions of a computerized information technology (IT) enterprise management system.

FIG. 1 is a block diagram illustrating generally one example of portions of such a computerized information technology (IT) enterprise management system 100. This particular example illustrates a client-server embodiment including at least one computer server 102 and one or more computer clients 104 that are coupled to the server 102 by a communications network 106 or other communications link. However, the system 100 does not require a client-server implementation, but could alternatively be implemented as a standalone system or in any other desired configuration. In the example of FIG. 1, the server 102 includes a relational or other database 108 and one or more software modules 110 for storing and accessing information in the database 108 and for implementing other IT enterprise management functionality. Each client 104 includes a user interface, such as for receiving and/or displaying data, as illustrated in FIG. 1.

2. Database Overview

Figure 2:
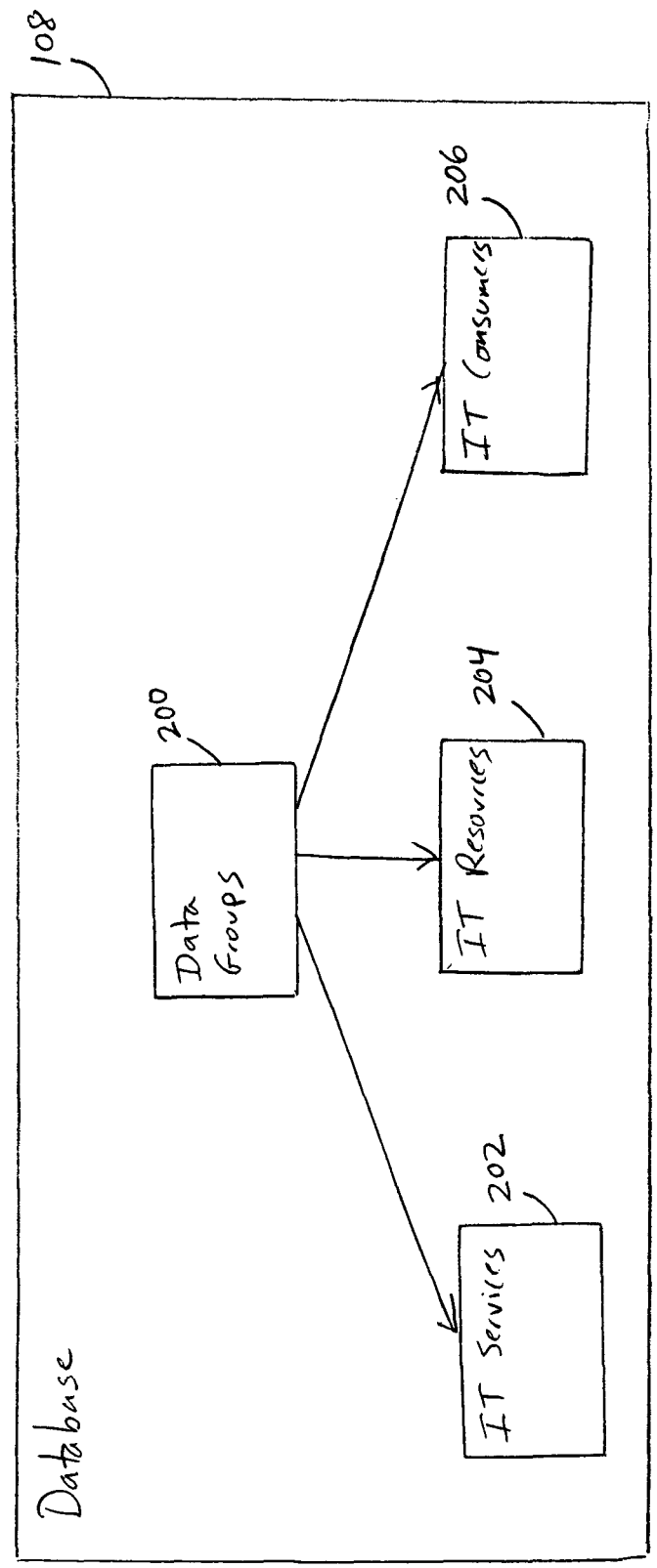
FIG. 2 is a block diagram illustrating generally one example of portions of a database.

FIG. 2 is a block diagram illustrating generally one example of portions of the database 108. The database 108 has been specifically designed to provide context to the process or IT decision making. For example, the database 108 includes data that is organized into data groups 200 that are particularly useful for supporting the IT decision making processes. In this example, the data groups 200 include an IT Services data group 202, an IT Resources data group 204, and an IT Consumers data group 206 (at this level of abstraction). The IT Services data group 202 includes data pertaining to various IT services provided to an organization. The IT Resources data group 204 includes data pertaining to various IT resources that are used for providing the IT services. The IT Consumers data group 206 includes data pertaining to various consumers of IT services within an organization. This organization of data is particularly valuable to IT decision making, and lends itself to providing functionality specific to IT decision making that extends beyond what a more generic enterprise management system is capable of offering.

Figure 3:
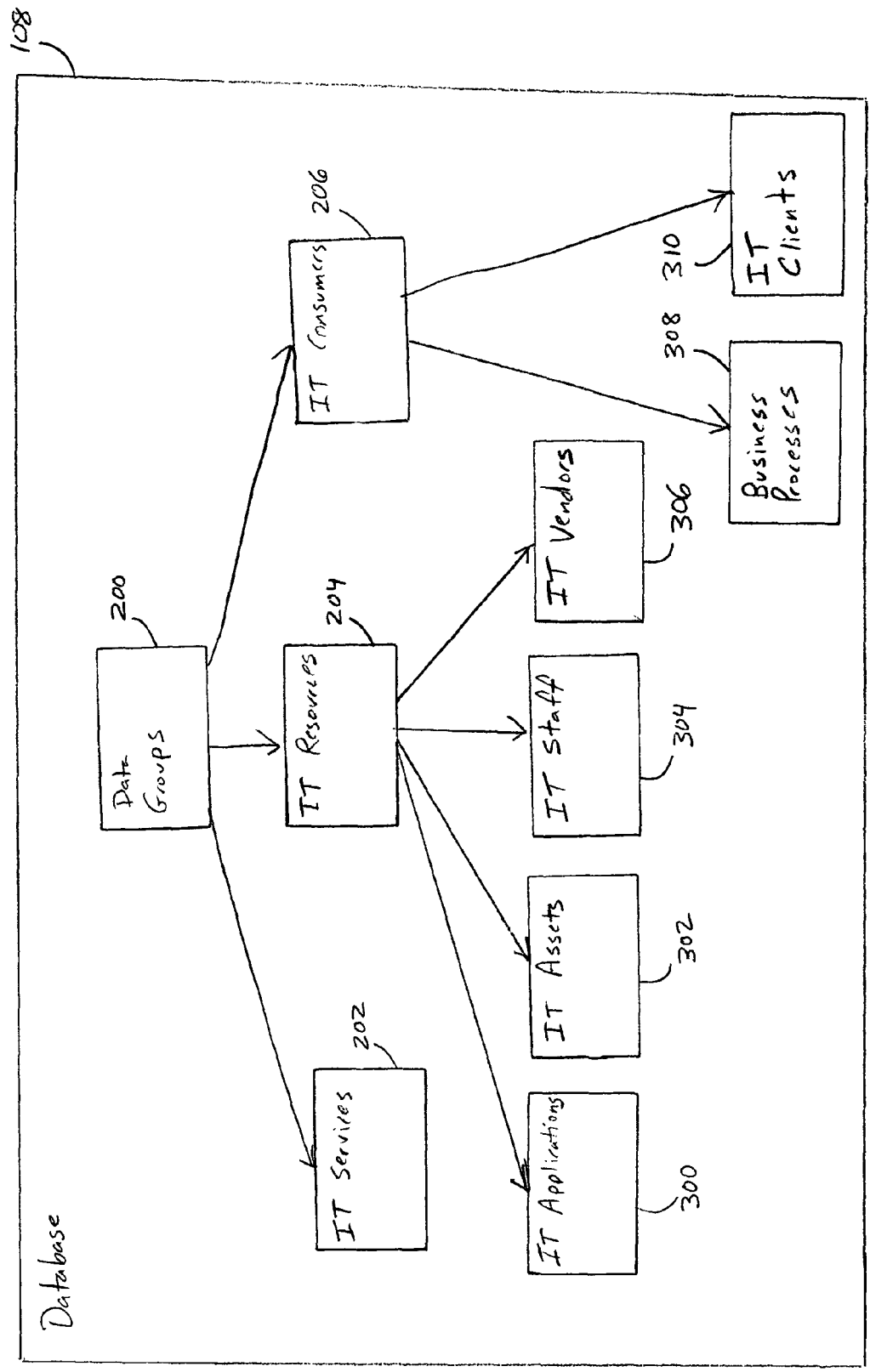
FIG. 3 is a block diagram illustrating generally a further example of portions of the database.

FIG. 3 is a block diagram illustrating generally a further example of portions of the database 108. In this example, the IT Resources data group 204 optionally includes one or more of the following constituents: an IT Applications data group 300, an IT Assets data group 302, an IT Staff data group 304, and an IT Vendors data group 306 (or any combination thereof). Also, in this example, the IT Consumers data group optionally includes one or more of the following constituents: a Business Processes data group 308 and an IT Clients data group 310. The IT Applications data group 300 includes data pertaining to one or more software applications that are used by the particular organization served by the system 100 (which may serve more than one such organization). The IT Assets data group 302 includes information about one or more hardware assets that are used by the organization. The IT Staff data group 304 includes information about one or more IT personnel that service the organization. The IT Vendors data group 306 includes information about one or more vendors that provide information technology equipment and/or services to the organization. The Business Processes data group 308 includes information about one or more business processes of the organization. The IT Clients data group 310 includes information about one or more IT clients (i.e., users of IT) within the organization (such IT clients may also be IT staff). This organization of data is also particularly valuable to IT decision making, as will become apparent throughout this document.

If one or more of the above constituents of the IT Resources data group 204 are used, then the IT Resources data group 204 need not be separately included (i.e., the IT Resources data group 204 merely represents a higher level of abstraction of its constituents). Similarly, if one or more of the above constituents of the IT Consumers data group 206 are used, then the IT Consumers data group 206 need not be separately included. Conversely, neither the IT Resources data group 204 nor the IT Consumers data group 206 is required to separate their data into the constituents illustrated above (such data could be aggregated at the higher level of the IT Resources data group 204 or the IT Consumers data group 206).

3. IT Applications

Applications Example

In one example, the IT Applications data group 300 includes information about one or more software applications that are used by the organization served by the IT enterprise management system 100. In one example, this information includes one or more of the following:

(a) An application name or identifier that identifies the software application (e.g., "Excel,""AutoCad," etc.).

(b) A vendor identifier that identifies one or more vendors of the software application (e.g., "Microsoft,""Oracle," etc.). In one example, the vendor identifier is linked to one or more vendors that are present in the IT Vendors data group 306.

(c) An application descriptor that stores descriptive information about the nature of the software application (e.g., "Word-Processing Software,""Accounts Payable Software," etc.).

(d) An application status indicator that provides information about the status of the software application (e.g., "Proposed,""Pending,""Active,""Legacy,""End-of-Life,""Retired," etc.).

Application Instances Example

In one example, the IT Applications data group 300 includes information about one or more application instances, that is, deployments of a software application within the organization served by the IT enterprise management system 100. In one example, this applications instances information includes one or more of the following:

(a) An application instance name or identifier that identifies the instance of the software application (e.g., a numeric or alphanumeric identifier that uniquely identifies a particular deployment of the software application on a hardware platform).

(b) An application instance location identifier (e.g., "Rack 10,""Building 6") that identifies a physical and/or geographic location within the organization where that instance of the software application is deployed on a hardware platform.

(c) A release version (e.g., "5.0") identifier that identifies the release version of that deployed instance of the software application.

(d) One or more application interface instance identifiers that identify one or more application interface instances associated with that deployed instance of the software application. Such an application interface instance denotes an interface between the deployed instance of a software application and another deployed instance of the same or a different software application (such as for communicating or sharing data, or for any other purpose). In one example, an application interface instance identifier creates a link between a deployed software application instance and one or more application interface instances.

(e) One or more business owner identifiers that identify one or more client personnel within the organization that use that deployed instance of the software application. In one example, a business owner identifier creates a link between a deployed software application instance and one or more personnel that are included in the IT Consumers data group 206 and/or the IT Clients data group 310.

(f) One or more sponsor identifiers that identify one or more client personnel within the organization that are responsible for or advocate for the deployed instance of the software application. In one example, a sponsor identifier creates a link between a deployed software application instance and one or more personnel that are included in the IT Consumers data group 206 and/or the IT Clients data group 310.

(g) One or more IT staff identifiers that identify one or more IT staff personnel within the organization that are responsible for servicing that deployed instance of the software application. In one example, an IT staff identifier creates a link between a deployed software application instance and one or more personnel that are included in the IT Resources data group 204 and/or the IT Staff data group 304.

(h) One or more organizational unit identifiers that identify one or more organizational units that use that deployed instance of the software application. In one example, an organizational unit identifier creates a link to organizational unit data that is included in the IT Consumers data group 206 and/or the IT Clients data group 310.

(i) One or more business process identifiers that identify one or more business processes that use that deployed instance of the software application. In one example, a business process identifier creates a link to business process data that is included in the IT Consumers data group 206 and/or the Business Processes data group 308.

(j) One or more asset identifiers that identify one or more hardware assets (e.g., desktop computers, servers, etc.) that use that deployed instance of the software application. In one example, the asset identifier creates a link to hardware asset data that is included in the IT Resources data group 204 and/or the IT Assets data group 302.

(k) A start date identifier that identifies when that deployed instance of the software application was put into service.

(l) An end date identifier that identifies when that deployed instance of the software application is expected to end (e.g., resulting from software license expiration, etc.).

Application Interfaces Example

In one example, the IT Applications data group 300 includes information about one or more software application interfaces that are used by the organization served by the IT enterprise management system 100. A software application interface operates between two or more software applications, such as for data exchange between the two software applications. In one example, this information includes one or more of the following:

(a) An application interface name or identifier that identifies the software application interface (e.g., "Order Entry-AR Interface" etc.).

(b) A vendor identifier that identifies one or more vendors of the software application interface. In one example, the vendor identifier is linked to one or more vendors that are present in the IT Vendors data group 306.

(c) An application interface descriptor that store descriptive information about the nature of the software application interface (e.g., "Order Entry-Accounts Receivable Interface" etc.).

Application Interface Instances Example

In one example, the IT Applications data group 300 includes information about one or more application interface instances, that is, deployments of software application interfaces within the organization served by the IT enterprise management system 100. A software application interface instance operates between two or more software application instances, such as for data exchange between the two software application instances. In one example, this application interface instances information includes one or more of the following:

(a) An application interface instance name or identifier that identifies the instance of the software application interface (e.g., a numeric or alphanumeric identifier that uniquely identifies a particular deployment of the software application interface on a hardware platform).

(b) An application interface instance location identifier (e.g., "Rack 10," "Building 6") that identifies a physical and/or geographic location within the organization where that instance of the software application interface is deployed on a hardware platform.

(c) A release version (e.g., "5.0") identifier that identifies the release version of that deployed instance of the software application interface.

(d) One or more application instance identifiers that identify one or more application instances associated with that deployed instance of the software application interface. In one example, an application instance identifier creates a link between a deployed software application interface instance and two or more software application instances.

(e) One or more business owner identifiers that identify one or more client personnel within the organization that use that deployed instance of the software application interface. In one example, a business owner identifier creates a link between a deployed software application interface instance and one or more personnel that are included in the IT Consumers data group 206 and/or the IT Clients data group 310.

(f) One or more sponsor identifiers that identify one or more client personnel within the organization that are responsible for or advocate for the deployed instance of the software application interface. In one example, a sponsor identifier creates a link between a deployed software application interface instance and one or more personnel that are included in the IT Consumers data group 206 and/or the IT Clients data group 310.

(g) One or more IT staff identifiers that identify one or more IT staff personnel within the organization that are responsible for servicing that deployed instance of the software application interface. In one example, an IT staff identifier creates a link between a deployed software application interface instance and one or more personnel that are included in the IT Resources data group 204 and/or the IT Staff data group 304.

(h) One or more organizational unit identifiers that identify one or more organizational units that use that deployed instance of the software application interface. In one example, an organizational unit identifier creates a link to organizational unit data that is included in the IT Consumers data group 206 and/or the IT Clients data group 310.

(i) One or more business process identifiers that identify one or more business processes that use that deployed instance of the software application interface. In one example, a business process identifier creates a link to business process data that is included in the IT Consumers data group 206 and/or the Business Processes data group 308.

(j) One or more asset identifiers that identify one or more hardware assets (e.g., desktop computers, servers, etc.) that use that deployed instance of the software application interface. In one example, the asset identifier creates a link to hardware asset data that is included in the IT Resources data group 204 and/or the IT Assets data group 302.

(k) A start date identifier that identifies when that deployed instance of the software application interface was put into service.

(l) An end date identifier that identifies when that deployed instance of the software application interface is expected to end (e.g., resulting from software license expiration, etc.).

Applications Screenshots Examples

Figure 4:
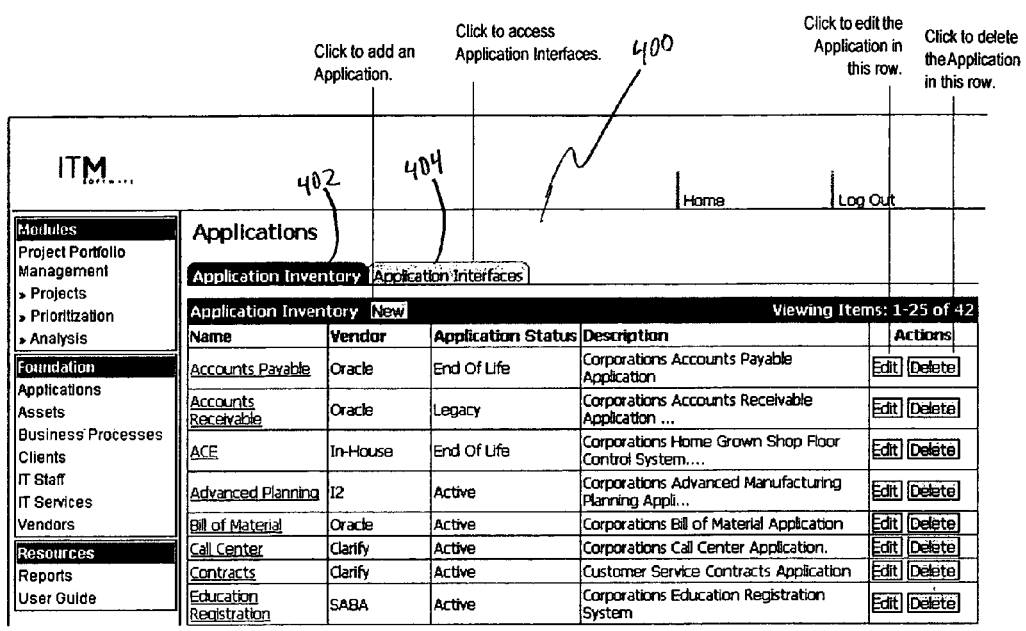
FIG. 4 is a user interface display screenshot of an example of an Applications screen.

FIG. 4 is a user interface display screenshot of an example of an Applications screen 400. In this example, the Applications screen 400 includes an Application Inventory 402 and an Application Interfaces Inventory 404, with associated tabs for selecting between these two inventories for display. Among other things, the Application Inventory 402 displays a list of the software applications used by the organization. Similarly, the Application Interface Inventory displays, among other things, a list of the software application interfaces used by the organization.

FIG. 5 is a user interface display screenshot of an example of a Application Details screen 500 obtained by using a mouse to click on one of the Applications in the displayed Applications Inventory 402 of FIG. 4. The Applications Details screen 500 permits a user to view and/or edit details pertaining to a particular software application.

FIG. 6 is a user interface display screenshot of an example of a New Application Instance screen 600 for adding and/or editing information about a particular application instance, that is, a particular deployment of a software application, such as on a particular hardware asset.

FIG. 7 is a user interface display screenshot of an example of an Application Instance Details screen 700, including information about a particular deployment of a software application, such as on a particular hardware asset. In one example, the user can navigate to the Application Instance Details screen 700 from the Applications screen 400 by selecting one of the applications listed in the Application inventory, which brings up a list of instances of that application (as well as an "Add New" button, if no instances of that application are listed); by selecting one of the application instances or the "Add New" button, the Application Instance Details screen 700 is displayed.

Figure 8:
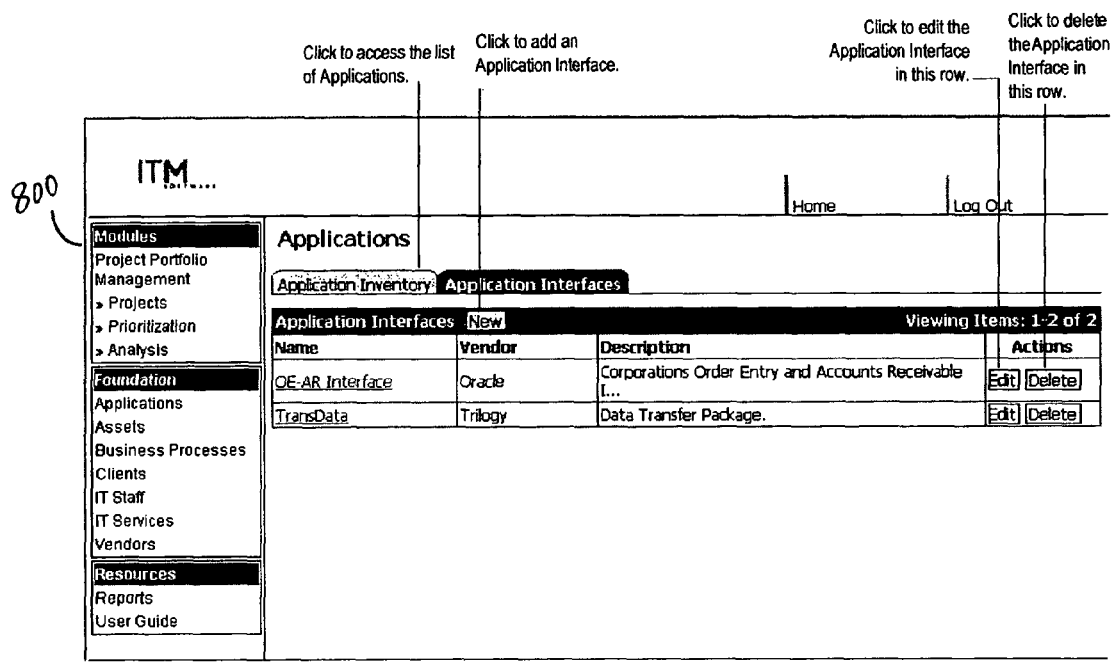
FIG. 8 is a user interface display screenshot of an example, of an Application Interfaces screen.

FIG. 8 is a user interface display screenshot of an example of an Application Interfaces screen 800, such as obtained by using a mouse to click on the Application Interfaces tab on the Applications screen 400.

FIG. 9 is a user interface display screenshot of an example of an Application Interface Details screen 900, such as can be obtained by using a mouse to click on a particular Application Interface displayed on the Application Interfaces screen 800.

FIG. 10 is a user interface display-screenshot of an example of an Application Interface Instance Details screen 1000, including information about a particular deployment of a software application interface, such as on a particular hardware asset. In one example, the user can navigate to the Application Interface Instance Details screen 800 from the Applications screen 400 by selecting one of the application interfaces listed in the Application Interfaces inventory, which brings up a list of instances of that application interface (as well as an "Add New" button, if no instances of that application interface are listed); by selecting one of the application interface instances or the "Add New" button, the Application Interface Instance Details screen 800 is displayed.

4. IT Assets

In one example, the IT Assets data group 302 includes information about one or more hardware assets (e.g., servers, desktop computers, portable computers, etc.) that are used by the organization served by the IT enterprise management system 100. In one example, this information includes one or more of the following:

(a) An asset name or identifier that identifies the nature of the hardware asset (e.g., "server,""desktop computer" etc.).

(b) An asset vendor identifier that identifies one or more vendors of the hardware asset (e.g., "Dell,""Cisco," etc.). In one example, the vendor identifier is linked to one or more vendors that are present in the IT Vendors data group 306.

(c) An asset descriptor that store descriptive information about the nature of the hardware asset (e.g., "E-mail server" etc.).

(d) An asset tag (such as a unique organizational serial number) that identifies the hardware asset.

(e) Asset Type and/or Subtype descriptors that provide predetermined classifications for the hardware asset, with the Type descriptor defining the available predetermined Subtype descriptors (e.g., Type=Hardware–Desktop, with available Subtypes=File Server, Laptop, Monitor, Web Server, etc.).

(f) An asset model identifier that identifies a model number or name associated with the asset.

(g) An asset version identifier that identifies a version associated with the asset.

(h) An asset operating system identifier that identifies an operating system associated with the asset.

(i) An asset IT function identifier that identifies where in the IT organization the asset is used.

(j) An asset location identifier (e.g., "Rack 10,""Building 6," that identifies location and/or geographic information associated with the asset.

FIG. 11 is a user interface display screenshot example of an Assets screen 1100 that, among other things, lists various assets within an organization, together with associate short asset descriptors.

Figure 12:
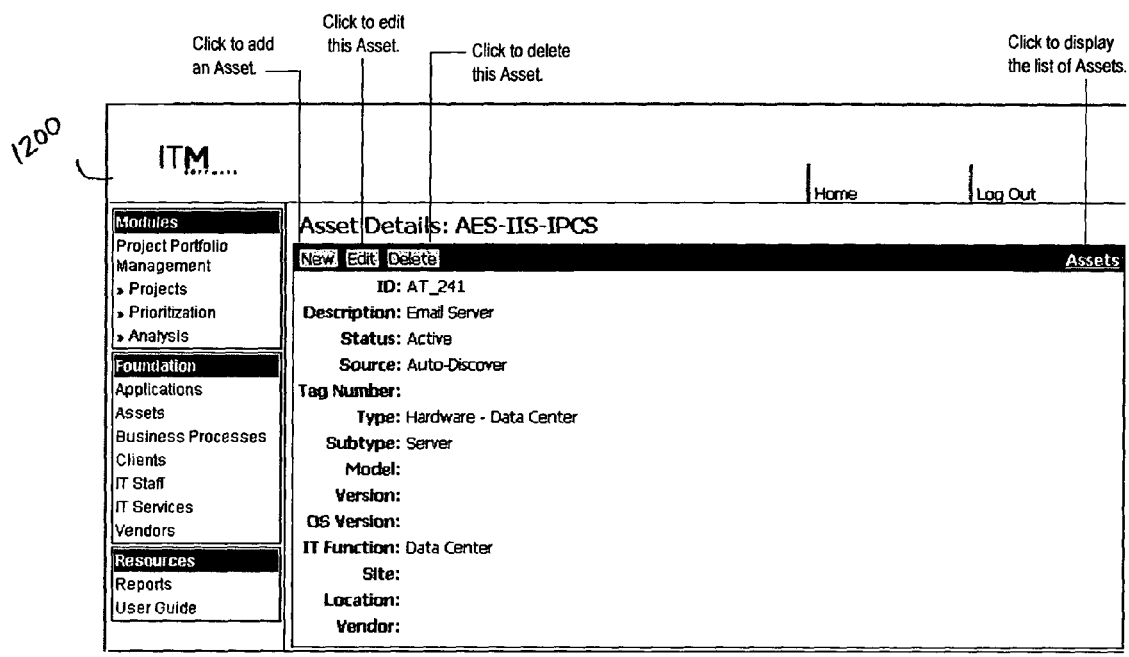
FIG. 12 is a user interface display screenshot example of an Asset Details screen.

FIG. 12 is a user interface display screenshot example of an Asset Details screen 1200 that is obtained, in one example, by using a mouse to click on a particular asset displayed on the Assets screen 1100.

5. Business Processes

In one example, the Business Processes data group 308 includes information about one or more business processes that are used by the organization served by the IT enterprise management system 100. In one example, this information includes one or more of the following:

(a) A business process name or other identifier that identifies the nature of the business process.

(b) A business processes descriptor that provides a brief description about the business process.

(c) One or more business process links to another business process. In one example, the business process link establishes a hierarchical link between the two business processes (e.g., a "parent-child" relationship).

(d) One or more business owner identifiers that identify one or more client personnel within the organization that use the business process. In one example, a business owner identifier creates a link between a business process and one or more personnel that are included in the IT Consumers data group 206 and/or the IT Clients data group 310.

(e) One or more business process sponsor identifiers that identify one or more client personnel within the organization that are responsible for or advocate for the business process. In one example, a sponsor identifier creates a link between a business process and one or more personnel that are included in the IT Consumers data group 206 and/or the IT Clients data group 310.

(f) One or more functional group (i.e., organizational unit) identifiers that identify one or more groups in the organization (e.g., "Corporate,""Product Development,""Infrastructure,""Customer Care,""Operations," etc.) that provide or use the business process.

(g) A business process provider type identifier, for example, that identifies whether the business process is outsourced, provided internally (e.g., by IT or another organizational unit). In one illustrative example, the provider type identifier takes on the values "Non-IT organizational unit,""IT," and "OutsourcedIVendor."

(h) An business process importance level identifier (e.g., "High,""Medium," and "Low") that identifies the importance of the business process, for example, in relation to other business processes.

(i) A business process health indicator (e.g., "Healthy,""Stable,""Fair,""Critical," etc.) that provides information about a state of health or condition of the business process.

(j) A business process type descriptor (e.g., "Automated,""Manual," etc.) that identifies a predefined type for association with the business process.

(k) One or more application instance identifiers that identify deployments of software applications used to support the business process. In one example, these application instance identifiers include links to data included in the IT Resources data group 204 and/or the IT assets data group 302.

(l) One or more business process vendor identifiers that identify one or more corresponding vendors associated with the business process. In one example, these business process vendor identifiers include links to data included in the IT Resources data group 204 and/or the IT Vendors data group 306.

(m) A "regulated" business process identifier that identifies whether the business process is regulated by law or by a government agency. In one illustrative example, the regulated business process identifier indicates whether the particular business process is related to the Sarbanes-Oxley Act.

(n) A version identifier that identifies a version of the business process.

FIG. 13 is a user interface display screenshot illustrating generally an example of a Business Processes screen 1300 listing, among other things, various business processes and other information associated with the business process. In one example, the Business Processes screen 1300 displays a hierarchy of business processes at a desired level of abstraction that is selectable by the user.

Figure 14:
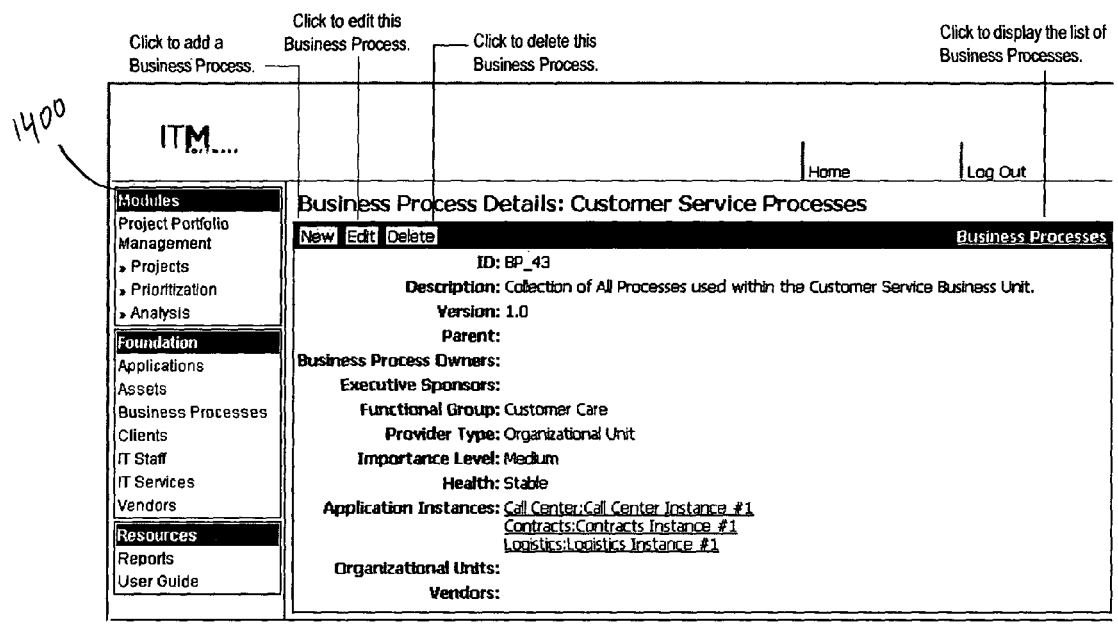
FIG. 14 is a user interface display screenshot illustrating generally an example of a Business Process Details screen.

FIG. 14 is a user interface display screenshot illustrating generally an example of a Business Process Details screen 1400 that provides more detailed information about a particular business process listed on the Business Processes screen 1300. The Business Process Details screen can be obtained, for a particular business process, by the user clicking a mouse on the particular business process displayed on the Business Processes screen 1300.

6. Clients

In one example, the IT clients data group 310 includes information about one or more IT clients of the organization served by the IT enterprise management system 100. In one such embodiment, information on supported clients outside the organization are listed as well. In one example, such information includes a client list that includes information about client personnel within the organization that use IT services. In a further example, such information includes information about client organizational units of the organization that use IT services. In yet a further example, such information also includes information about one or more organizational objectives associated with one or more of the organizational units. Including the organizational structure and/or objectives, permits the IT enterprise management system 100 to assist in allocating IT resources according to such structure and/or objectives.

Figure 15:
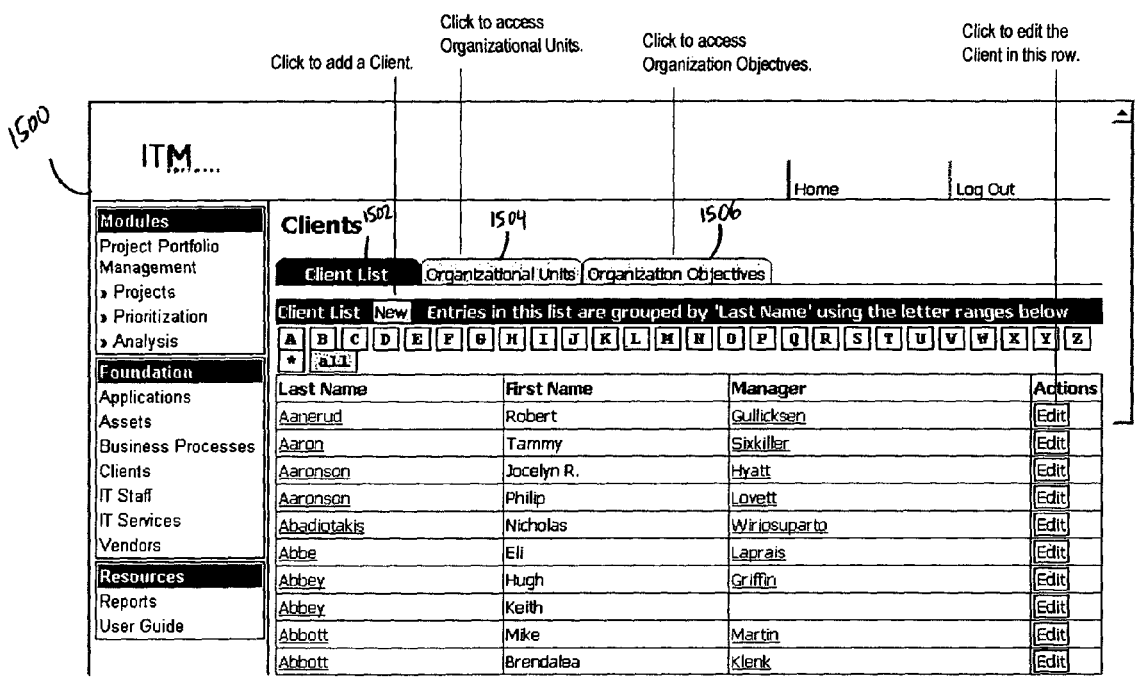
FIG. 15 is a user interface display screenshot of one example of a Clients screen

FIG. 15 is a user interface display screenshot of one example of a Clients screen 1500 including, among other things, a Client List tab 1502, an Organizational Units tab 1504, and an Organization Objectives tab 1506, for displaying such information.

In one example, the IT Clients data group 310 includes information about one or more IT clients in the organization served by the IT enterprise management system 100. In one example, this client information includes one or more of the following:

(a) A client name identifier that identifies the client's name.

(b) A client user name identifier that identifies the client's login name and optionally identifies the client's IT access privileges.

(c) A client business title that describes the client's role or position within the organization.

(d) A client's e-mail address, and optionally a client's alternate e-mail address.

(e) A client's manager that identifies who the client reports to in the reporting structure of the organization. In one example, this client manager information creates a link to another client in the IT Clients data group 310.

(f) A client's hiring status identifier that identifies whether the client is an employee of the organization or a contractor within the organization.

(g) A client's active status identifier that identifies whether the client is currently an employee or contractor within the organization.

(i) An client's IT staff member identifier that identifies whether the client is an IT staff member within the organization.

Figure 16:
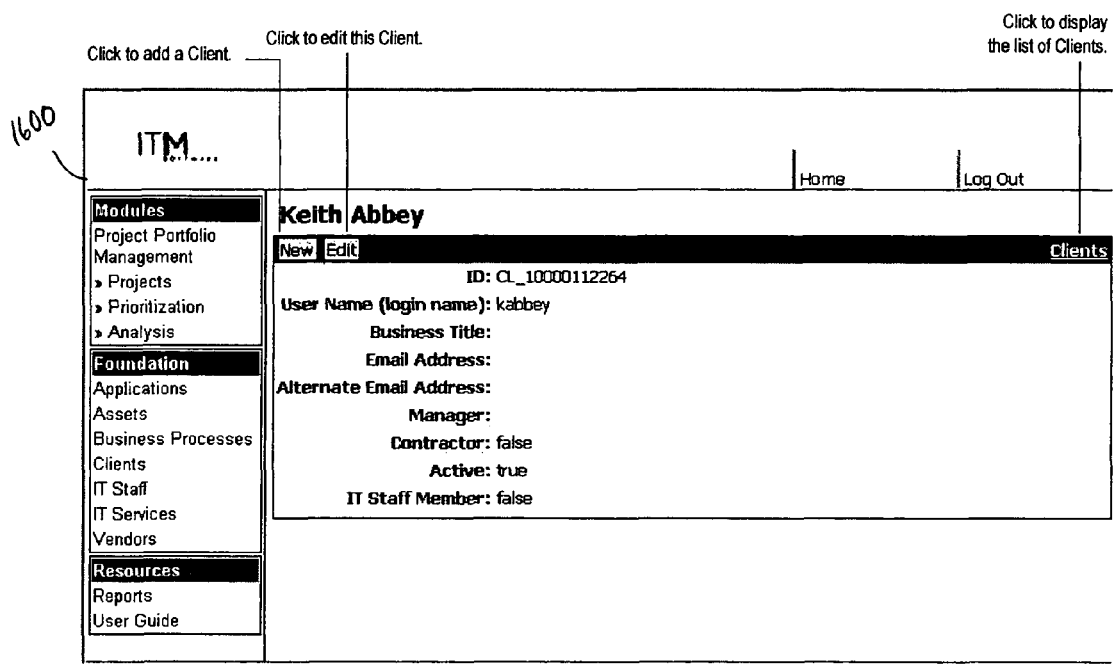
FIG. 16 is a user interface display screenshot that illustrates an example of a Client Details screen.

FIG. 16 is a user interface display screenshot that illustrates an example of a Client Details screen 1600 that permits a user to view and/or edit information about a particular client. In one example; the Client Details screen is brought up by the user clicking on a particular client in the client list of FIG. 15.

Figure 17:
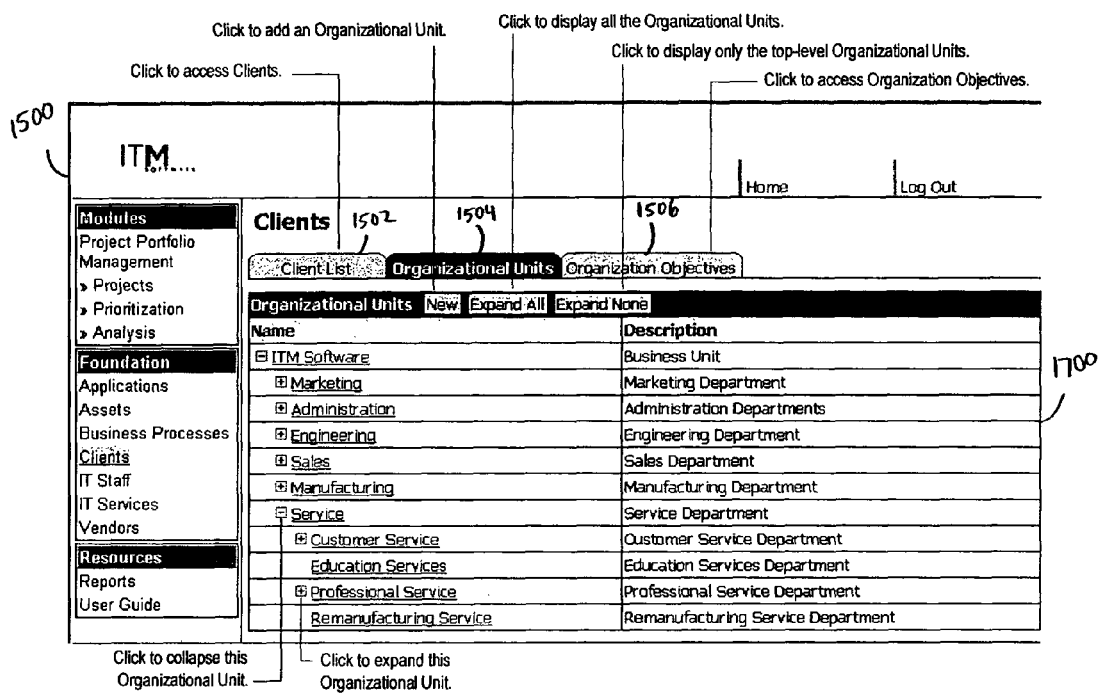
FIG. 17 is a user interface display screenshot that illustrates an example of the Clients screen in which the user has triggered an Organizational Units display.

FIG. 17 is a user interface display screenshot that illustrates an example of the Clients screen 1500. In this example, the user has used a mouse to click and select the organizational units tab 1504 to trigger an Organizational Units display 1700. In one example, the Organizational Units display 1300 displays a hierarchy of organizational units at a desired level of abstraction that is selectable by the user.

As illustrated in FIG. 17, in one example, the IT Clients data group 310 includes information about one or more organizational units of the organization served by the IT enterprise management system 100. In one example, this organizational unit information includes one or more of the following:

(a) An organizational unit name or other identifier that identifies the organizational unit, such as by its nature and/or its function.

(b) An organizational unit descriptor that provides descriptive information about the organizational unit.

(c) One or more links to another organizational unit, such as a "parent" (or other hierarchical) link to identify a parent-child relationship between two organizational units.

(d) One or more IT staff identifiers that identify an IT staff member that serves the organizational unit. In one example, an IT staff identifier creates a link to data in the IT Resources data group 204 and/or the IT Staff data group 304.

(e) One or more sponsor identifiers that identify one or more client personnel within the organization that are responsible for, advocate for, and/or represent the particular organizational unit. In one example, a sponsor identifier creates a link between the particular organizational unit and one or more personnel that are included in the IT Consumers data group 206 and/or the IT Clients data group 310.

Figure 18:
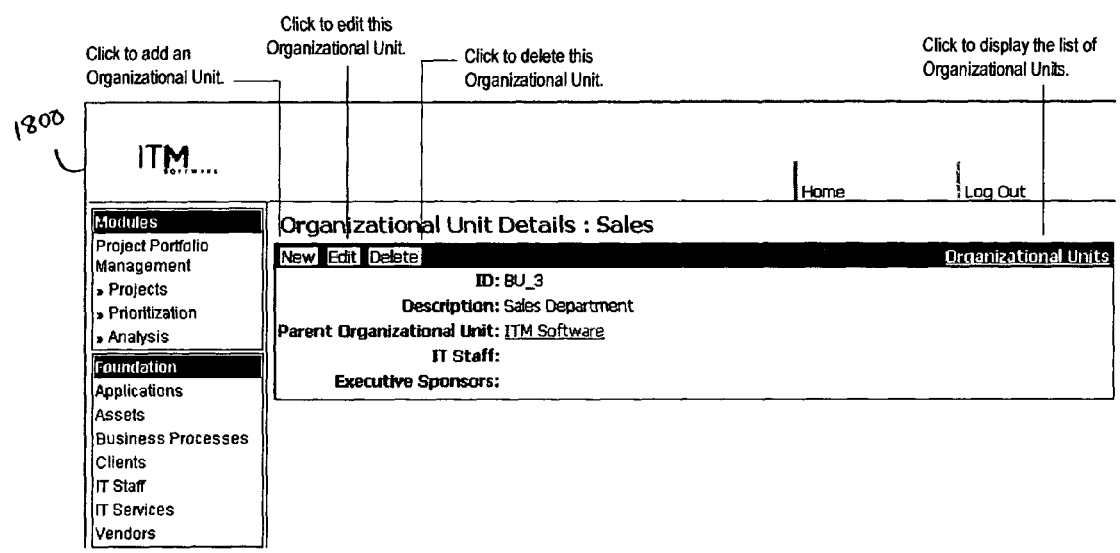
FIG. 18 is a user interface display screenshot of one example of an Organizational Unit Details screen.

FIG. 18 is a user interface display screenshot of one example of an Organizational Unit Details screen 1800 that displays information about a particular organizational unit. In one example, display of the Organizational Unit Details screen 1800 is triggered by a user using a mouse or other user input device to click on and select a particular one of the organizational units displayed in the Organizational Units display 1700 of FIG. 17.

Figure 19:
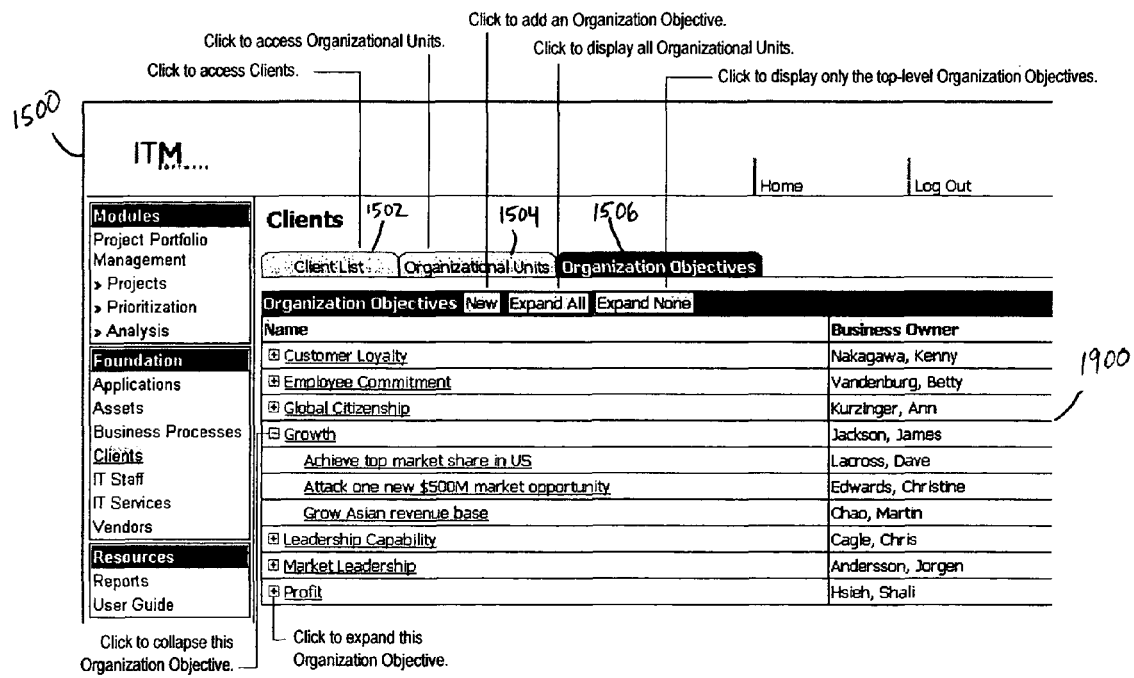
FIG. 19 is a user interface display screenshot that illustrates an example of the Clients screen.

FIG. 19 is a user interface display screenshot that illustrates an example of the Clients screen 1500. In this example, the user has used a mouse to click and select the organizational objectives tab 1506 to trigger an Organizational Objectives display 1900. In one example, the Organizational Objectives display 1900 displays a hierarchy of organizational objectives at a desired level of abstraction that is selectable by the user.

As illustrated in FIG. 19, in one example, the IT Clients data group 310 includes information about one or more organizational objectives of the organization served by the IT enterprise management system 100. In one example, this organizational objectives information includes one or more of the following:

(a) An organizational objective name or other identifier that identifies the organizational objective or its nature.

(b) One or more organizational objective business owners that identify personnel within the organization that are responsible for, advocate for, or represent that organizational objective.

(c) An organizational objective descriptor that stores further descriptive information about a particular organizational objective.

(d) One or more links to another organizational objective, such as a "parent" (or other hierarchical) link to identify a parent-child relationship between two organizational objectives.

(e) One or more links to organizational units that have or are responsible for the particular organizational objective.

(f) A planned start date for the particular organizational objective.

(g) A planned end date for the particular organizational objective.

(h) An actual apparent start date for the particular organizational objective.

(i) An actual apparent end date for the particular organizational objective.

Figure 20:
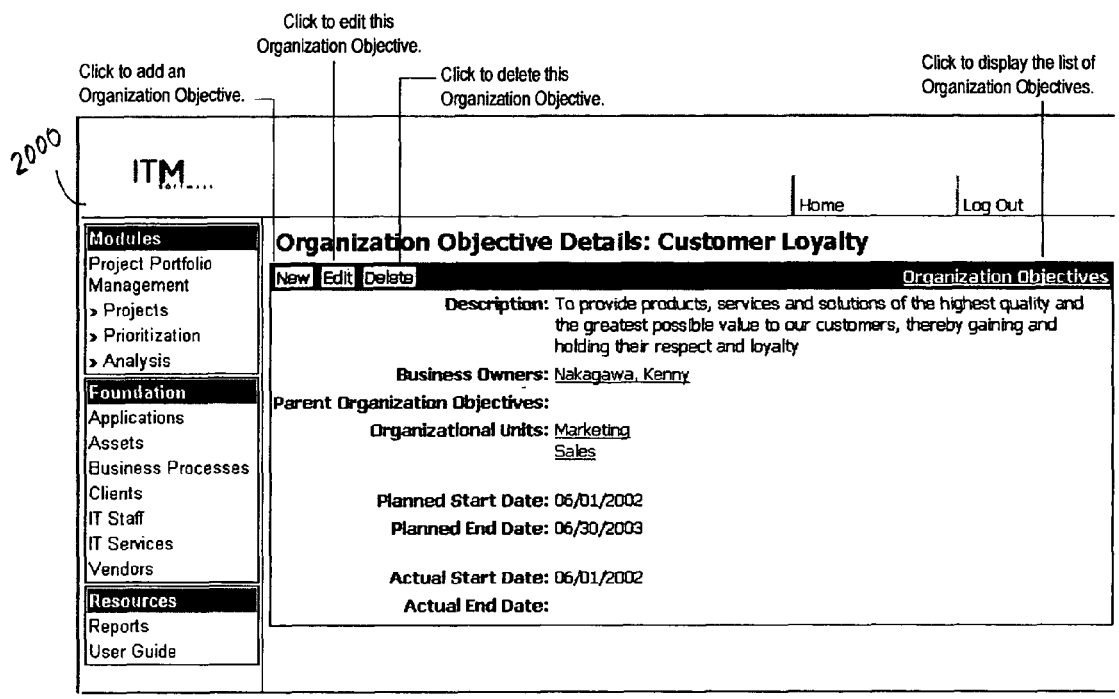
FIG. 20 is a user interface display screenshot of an example of an Organizational Objective Details screen.

FIG. 20 is a user interface display screenshot of an example of an Organizational Objective Details screen 2000, such as can be obtained by a user by using a mouse to click on or otherwise select a particular one of the organizational objectives in the Organizational Objective display 1900 of FIG. 19.

7. IT Staff

FIG. 21 is a user interface display screenshot of an example of an IT Staff screen 2100. In this example, the IT Staff screen 2100 displays, among other things, a list of personnel within the organization that belong to the IT staff and are therefore included within the IT Resources data group 204 and/or the IT Staff data group 304.

As illustrated in FIG. 21, in one example, the IT staff data group 310 includes information about one or more IT personnel that provide IT services to the organization served by the IT enterprise management system 100. In one example, this IT staff information includes one or more of the following:

(a) An IT staff member identifier that identifies the IT staff person's name.

(b) An IT staff member user name identifier that identifies the IT staff member's login name and optionally identifies the IT staff members IT access privileges.

(c) An IT staff member business title that describes the IT staff member's role or position within the IT group of the organization.

(d) An IT staff member's e-mail address, and optionally the IT staff member's alternate e-mail address.

(e) An IT staff member's manager identifier that identifies who the IT staff member reports to in the reporting structure of the IT group of the organization. In one example, this IT staff member manager information creates a link to another IT staff member in the IT Staff data group 304.

(f) An IT staff member's hiring status identifier that identifies whether the IT staff member is an employee of the IT group of organization or a contractor within the IT group of the organization.

(g) An IT staff member's active status identifier that identifies whether the IT staff member is currently an employee or contractor within the IT group of the organization.

(h) An IT staff member identifier that identifies the IT staff member as an IT staff member within the organization.

(i) An IT staff member's geography or location identifier that identifies the geographic or physical location (e.g., "Americas,""Asia-Pacific,""Japan," etc.) where the IT staff member works.

(j) An IT staff member's IT group identifier that identifies a particular group within the IT group of the organization where the IT staff member works (e.g., "Applications,""Data Center,""Desktop Computing,""Network Operations," etc.).

(k) An IT staff member job function identifier or descriptor that identifies or describes a functional job category of the IT staff member (e.g., "Architect,""Development,""Operations Support," etc.).

(l) One or more IT staff member organizational unit identifiers that identify which one or more organizational units within the organization that the IT staff member supports, or is otherwise significantly involved with. In one example, any such IT staff member organizational unit identifiers is implemented as a link to data in the IT Consumers data group 206 and/or the IT Clients data group 310.

Figure 22:
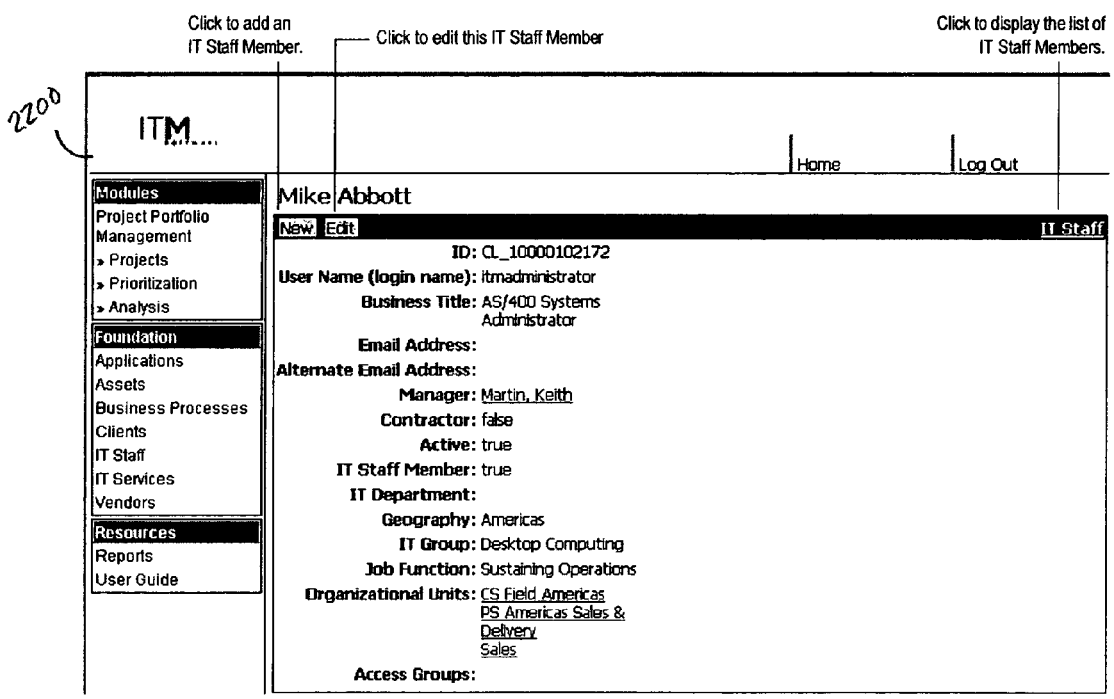
FIG. 22 is a user interface display screenshot of one example of an IT Staff Member Details screen.

FIG. 22 is a user interface display screenshot of one example of an IT Staff Member Details screen 2200 for a particular IT staff member. In one example, display of the IT Staff Member Details screen 2200 is triggered by the user clicking a mouse or otherwise selecting a particular one of the IT staff members listed on the IT Staff screen 2100.

8. IT Services

FIG. 23 is a user interface display screenshot of one example of an IT Services screen 2300. In one example, the IT Services screen 2300 includes, among other things, information about IT services being provided by the IT group of the organization.

As illustrated in FIG. 23, the IT Services data group 202 includes information about IT services being provided by the IT group of the organization. In one example, such information includes one or more of the following:

(a) An IT service name or other identifier identifying the IT service or its nature.

(b) An IT service descriptor including other descriptive information about the particular IT service.

(c) An IT service class (and a further optional subclass) descriptor that identifies functional areas in which the IT service is being provided. In one example, the class and subclass descriptors provide predetermined classifications for the IT service, with the class descriptor defining the available predetermined subclass descriptors (e.g., Class=Network, with available Subclasses=Server, Desktop, and Router; or Class=Application, with available Subclasses=Operating System, Database, Application, and Server; etc.).

(d) An IT service category descriptor that categorizes the IT service, such as into one of several predetermined categories (e.g., "Equipment,""Utility,""Application," etc.).

(e) An IT service price identifier that specifies how much the IT department of the organization charges (actually or theoretically) for the IT service.

(f) An IT service cost identifier that specifies the cost of providing the IT service to the organization.

(g) An IT service metric that quantifies how much and/or how effectively the IT service is being provided.

(h) One or more IT service vendors that provide the IT service or are related to the providing of the IT service. In one example, the IT service vendor information creates a link to vendor data in the IT Resources data group 204 and/or the IT Vendors data group 306.

Figure 24:
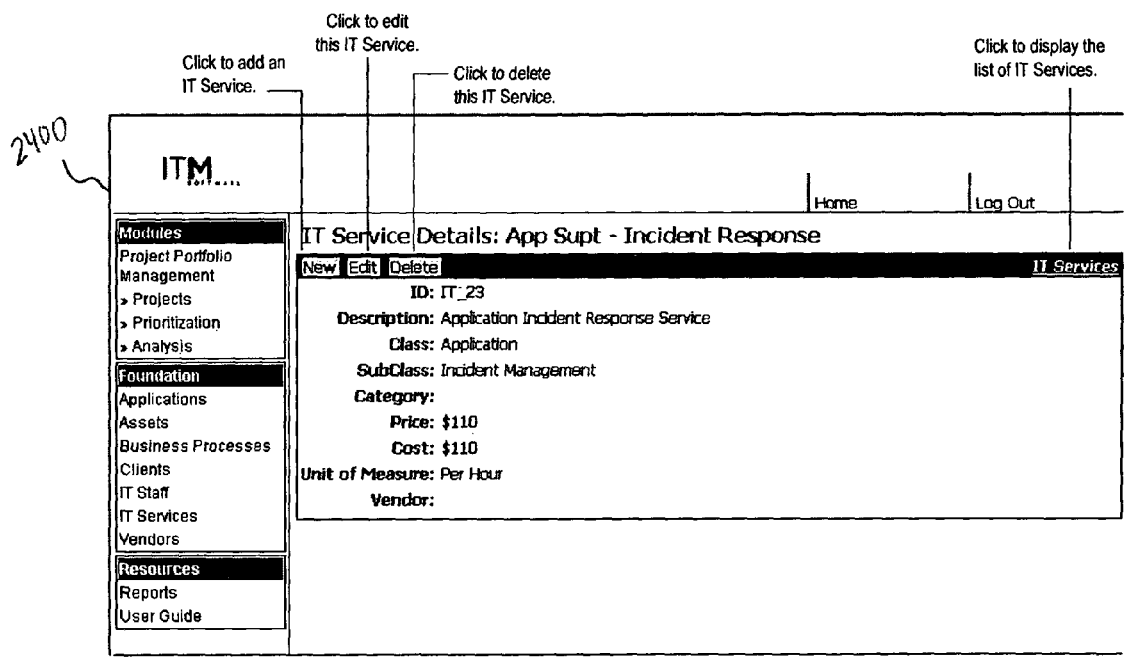
FIG. 24 is a user interface display screenshot of one example of an IT Service Details screen.

FIG. 24 is a user interface display screenshot of one example of an IT Service Details screen 2400. In this example, the IT Service Details screen 2400 provides, among other things, information about a particular IT service. In one example, display of the IT Service Details screen 2400 is triggered by the user clicking a mouse or otherwise selecting a particular IT service on the IT Service screen 2300 of FIG. 23.

9. IT Vendors

FIG. 25 is a user interface display screenshot of one example of an IT Vendors screen 2500. In one example, the IT Vendors screen 2500 includes, among other things, information about IT vendors that provide IT equipment and/or services to the organization.

As illustrated in FIG. 25, the IT Vendors data group 306 includes information about IT vendors. In one example, such information includes one or more of the following:

(a) An IT vendor name or other vendor identifier that identifies the particular vendor.

(b) An IT vendor descriptor that provides other descriptive information about the vendor and the goods and/or services provided by the vendor.

(c) An IT vendor number that uniquely identifies the vendor in a manner suitable for mapping the IT vendor to another database or software system (e.g., outside of the IT enterprise management system 100), such as an enterprise resource planning (ERP) system, for example.

(d) One or more links to another IT vendor, such as a "parent" (or other hierarchical) link to identify a parent-child relationship between two vendors.

(e) An IT vendor type that identifies which categories of goods and/or services are provided by a particular vendor (e.g., "hardware,""software," etc.).

(f) One of more IT vendor function identifiers that identify which IT functions are associated with the particular vendor (e.g., "Application,""Data Center,""Desktop,""Network," etc.).

(g) An IT vendor status identifier that identifies the status of the business relationship between the organization and the IT vendor (e.g., "Evaluation,""Production," etc.).

(h) An IT vendor address identifier that identifies a physical and/or electronic (e.g., uniform resource locator, or URL) address of the IT vendor.

(i) One or more IT vendor owner identifiers that identify personnel within the IT group or elsewhere within the organization that have contact with a particular vendor. In one example, the IT vendor owner information creates links to IT staff personnel in the IT Resources data group 204 and/or the IT Staff data group 304.

Figure 26:
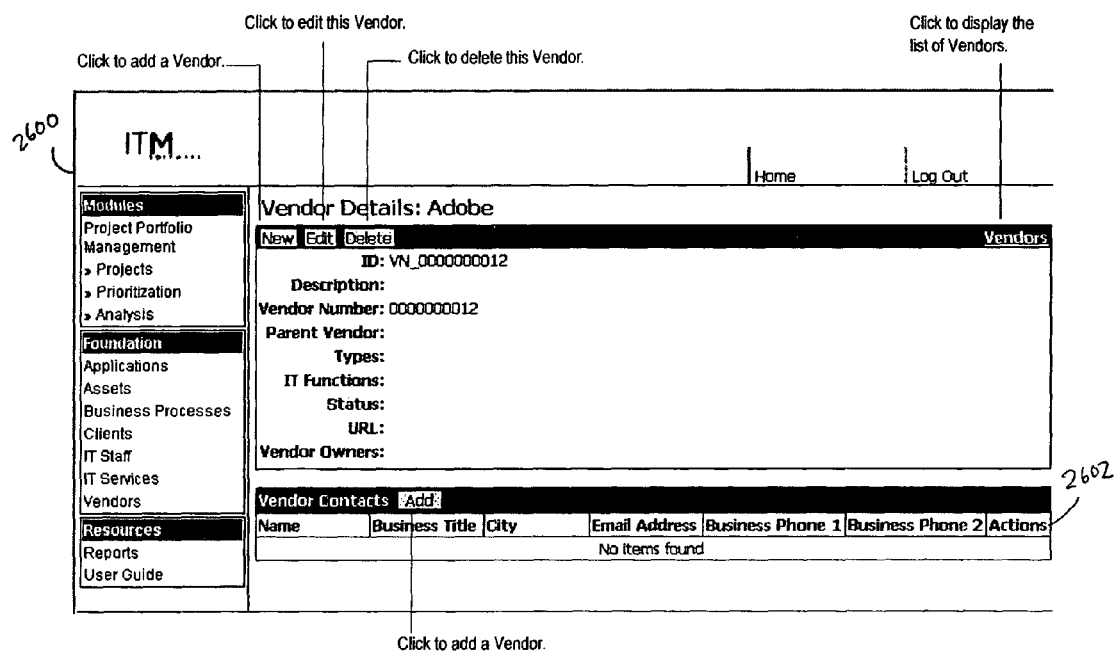
FIG. 26 is a user interface display screenshot of one example of a Vendor Details screen.

FIG. 26 is a user interface display screenshot of one example of a Vendor Details screen 2600 that provides information about a particular vendor. In one example, display of the Vendor Details screen 2600 is triggered by the user clicking a mouse or otherwise selecting a particular vendor on the IT Vendors screen 2500 of FIG. 25. The Vendor Details screen 2600 includes a Vendor Contacts screen 2602 permitting storage, editing, and display of information about one or more contact personnel at the vendor for the organization. Such contact information may include, among other things, one or more of name, e-mail address, telephone, fax, pager, business title, role, address, and other descriptive information about the particular vendor contact.

10. Reporting

Figure 27:
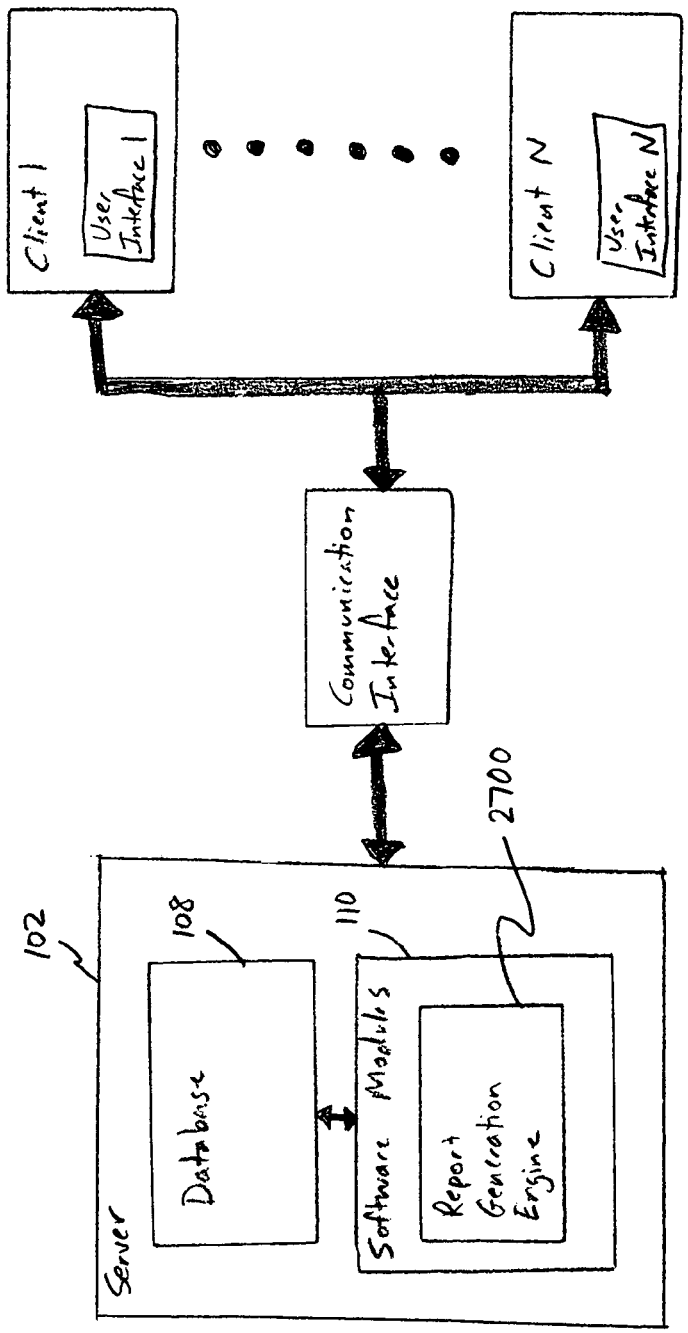
FIG. 27 is a block diagram illustrating an example of the IT enterprise management system that includes a report generation engine.

In one example, the IT enterprise management system 100 includes a report generation engine 2700, such as in one of the software modules 110, as illustrated in the block diagram of FIG. 27. The report generation engine 2700 uses the data entities, and the organization of the data entities into the data groups 200 discussed above. The report generation engine 2700 also makes use of the links between data entities in the same or different data groups in generating reports for the user, such as displayed on a user interface at one of the client devices 104. In addition to customizable reports that are capable of using such properties, the report generation engine 2700 also provides certain predefined reports. Examples of predefined reports include, without limitation, one or more of the following:

(a) An Organizational Unit report that hierarchically lists each organizational unit of the organization served by the system 100. In a further example, the report also optionally lists the sponsors and IT staff for each organizational unit.

(b) A Client report that summarizes information about organization personnel.

(c) An Organization Objectives report lists organizational objectives by organizational unit, such as in tabular form. In a further example, the report also optionally lists, for each objective, a business owner, planned start and end dates, and/or actual start and end dates.

(d) An Organization Objectives Detail report that hierarchically lists organizational objectives. In a further example, the report also optionally lists, for each objective, a business owner, planned start and end dates, and/or actual start and end dates.

(e) A Business Processes report that summarizes and provides information about business processes (e.g., one or more of: process, version, organizational group supported by the process, sponsor, process owner, application instance that supports the process and/or the number of direct processes affected by the particular process).

(f) An IT Staff report that provides information about IT staff personnel, segmented according to one or more of active/inactive status, employee/contractor status, title, management level, etc.

(g) A Headcount Metric report, segmented by organizational unit, listing IT staff personnel supporting that organizational unit, along with the specific roles of such IT staff personnel in providing such support.

(h) An Applications and Application Instances report that summarizes applications used by the organization and specific deployments (i.e., instances) of those applications. In one example, each application instance is listed, along with one or more of its location, release version, associated organizational unit, business owner, supporting IT staff, and/or its expected start and end dates.

(i) An Application Interfaces and Application Interfaces Instances report that summarizes the application interfaces used by the organization and specific deployments (i.e., instances) of those application interfaces. In one example, each application interface is profiled with one or more of its vendor, its number of application interface instances, and/or its description. In a further example, each application interface instance is then listed, along with corresponding information about that application interface instance including one or more of its location, release version, associated organizational unit or units, business owner, supporting IT staff, and/or its expected start an end dates.

(j) An IT Assets report that includes the total number of IT assets in the organization that are currently being tracked by the system 100. In one example, this report also lists each IT asset along with one or more of its source organizational unit, status, IT function performed, type, subtype, operating system version, site, location, and/or the asset tag.

(k) An IT Services report that includes the total number of IT services being provided to the organization that are currently being tracked by the system 100. In one example, this report also lists each IT service, along with its class, subclass, IT service metric, vendor, cost, and/or price.

(l) An IT Vendors report that lists the total number of IT vendors to the organization that are currently being tracked by the system 100. In one example, this report also lists each IT vendor, along with any applications, application interfaces, or IT services associated with that vendor. In a further example, information about each listed IT vendor also includes one or more of the following: descriptive information about the vendor, the IT vendor number, any links to other IT vendors, IT vendor type, IT vendor function, and/or IT vendor status.

11. IT Project Portfolio Management Application Module

Overview

As noted above, the database 108 serves as a comprehensive knowledge base that is particularly well suited to support the process of IT decision making and the implementation of IT "best practices." The software module(s) 110 are designed to exploit the knowledge base for particular IT decisions.

Figure 28:
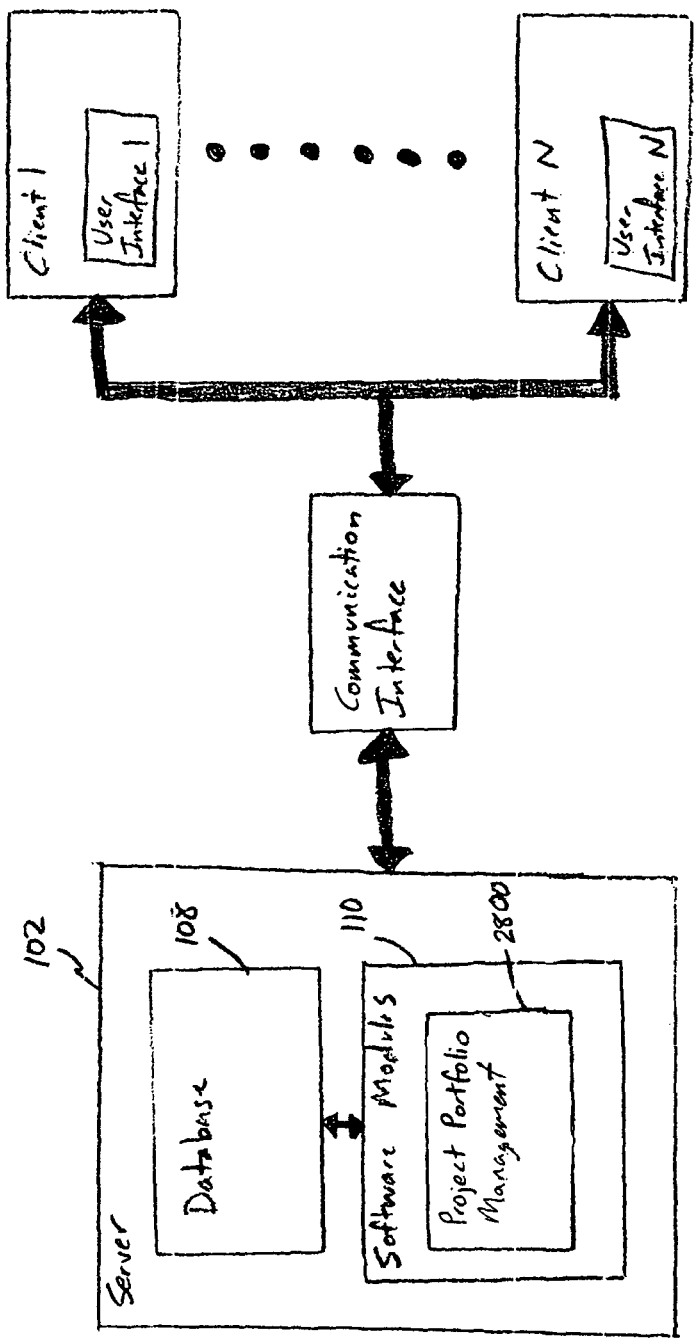
FIG. 28 is a block diagram illustrating an example of the IT enterprise management system that includes an IT Project Portfolio Management (PPM) application module.
Figure 29:
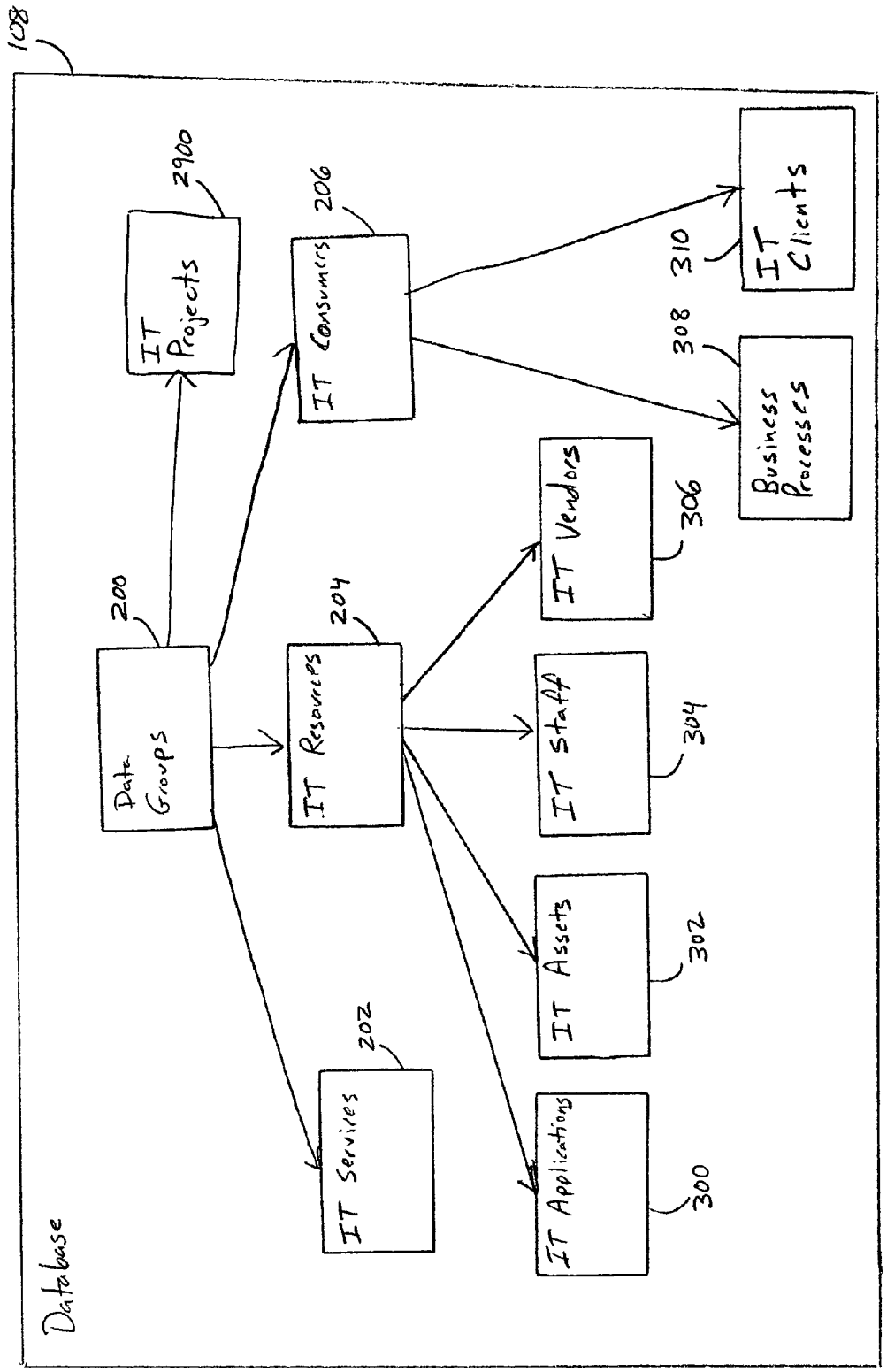
FIG. 29 is a block diagram illustrating an example of the PPM application module used in conjunction with an additional IT Projects data group.

In one example, the IT enterprise management system 100 includes an IT Project Portfolio Management (PPM) application module 2800, such as in one of the software modules 110, as illustrated in the block diagram of FIG. 28. The PPM application module 2800 allows a CIO or other user to both analyze an organization's IT portfolio. It also can be used as a tool to effectively manage IT projects within the organization. The PPM application module 2800 uses the data entities, and the organization of the data entities into the data groups 200, as discussed above. In one example, the PPM application module 2800 is used in conjunction with an additional IT Projects data group 2900, as illustrated in FIG. 29. The PPM application module 2800 also makes use of the links between data entities in the same or different data groups in providing IT project management. Among other things, by using project inventory and value analysis capabilities provided by the PPM application module 2800, the user can identify winning IT projects that merit resources and spot losing initiatives that should be investigated or potentially cancelled, as discussed below.

IT Projects Data Group Example

In one example, the IT Projects data group 2900 includes information about IT projects. In one example, such information about a particular IT project includes one or more of the following:

(a) An IT project name or other identifier to name or otherwise identify the IT Project being tracked.

(b) An IT project requester that identifies a person within the organization that requested the IT project.

(c) One or more links to or other identifiers of organizational unit(s) that are impacted by the IT project.

(d) An IT project due date when the project should be complete.

(e) An IT project importance identifier (e.g., "Immediate/Urgent,""High,""Medium,""Low," etc.) that identifies the priority of the IT project.

(f) An IT project state identifier, that identifies the state of the IT project being tracked (e.g., "Pending,""Active,""Deferred,""Cancelled,""Completed,"etc.).

(g) An IT project description that stores descriptive information about the nature of the IT project being tracked.

Project Portfolio Management Screen Example

Figure 30:
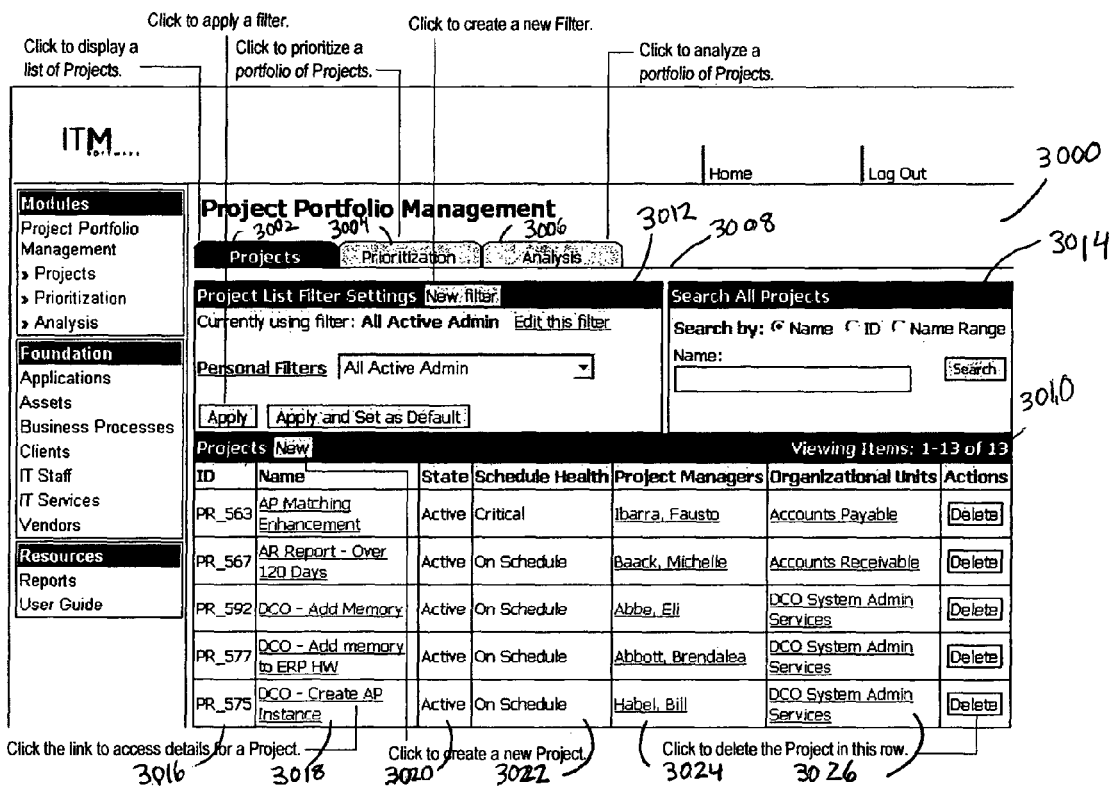
FIG. 30 is a user interface display screenshot illustrating one example of a PPM screen.

FIG. 30 is a user interface display screenshot illustrating one example of a PPM screen 3000 provided by operating the PPM application module 2800. In this example, the PPM screen 3000 includes at least one of a user-selectable "Projects" tab 3002, a "Prioritization" tab 3004, and/or an "Analysis" tab 3006, respectively corresponding to separate user interface display screens for (1) Project Management, (2) Portfolio Prioritization, and (3) Portfolio Analysis components of the PPM application module 2800.

In the example of FIG. 30, the "Projects" display screen 3008 is active. It includes at least one of an IT Projects list 3010, user determinable filters 3012 for selecting projects for display in the IT Projects list 3010, and/or a search engine interface 3014 for searching for information about particular projects in the IT Projects list 3010. As illustrated in FIG. 30, the IT Projects list 3010 includes a display of useful summary information about various IT projects, such as one or more of an IT project identifier 3016, an IT project name indicator 3018, an IT project state indicator 3020, an IT project schedule health parameter 3022, the IT project manager 3024, and/or the organizational unit(s) 3026 associated with the IT project.

IT Project Details Screen Example

FIG. 31 is a user interface display screenshot illustrating one example of a IT Project Details screen 3100 for a particular IT Project. In one example, the IT Project Details screen 3100 is obtained for a particular project by using a mouse to click on or otherwise selecting the particular project displayed on the IT Projects list 3010 on the Projects screen 3010 of the PPM screen 3300.

In the example of FIG. 31, the IT Project Details screen 3100 includes a Project Request screen 3102, a Project Lifecycle screen 3104, an Attachments screen 3106, a Links screen 3108, and a Project Summary Information screen 3110. The Project Request screen 3102 includes information about one or more of the following: who requested the IT project, who created the IT project in the system 100, when the IT project was created in the system 100 who last updated the project, when the IT project was last updated in the system 100, the state of the project, the organizational unit(s) associated with the project, the project due date, importance level of the project, and a description of the project. The Project Lifecycle screen 3104 tracks information during various phases of the lifecycle of the project, as discussed below. The Attachments screen 3106 allows supporting documents to be attached to a particular project (e.g., a Microsoft POWERPOINT® presentation, a Microsoft PROJECT® plan, etc.). Such attachments can be viewed, edited, or deleted, as desired. The Links screen 3108 permits active links (rather than attachment) to such documents and/or web pages by specifying a Uniform Resource Locator addresses. The Project Summary Information screen 3110 provides information about an IT project that is relevant to its relationship to other IT projects in the organization. Among other things, the Project Summary Information screen 3110 includes one or more of:

(a) A priority summary, that provides an overview of the current priorities for the particular IT project, such as in all the organizational units that are associated with that particular IT project.

(b) An impact summary that provides an overview of the items affected (directly or indirectly) by the particular IT project. In one example, the Impact Summary indicates which Business Processes are at risk if the particular IT project fails. Such information is determined, in one example, by examining any relationships between application instances associated with the particular IT project, and the Business Processes that are associated with those application instances. In a further example, this determination also examines the application instances associated with the particular IT project, and whether those application instances are linked to any other Business Processes.

Project Lifecycle Overview

The Project Lifecycle screen 3104 includes information relevant to managing certain project steps in the project's lifecycle. In this example, the project steps in the IT project's lifecycle are designated "Definition,""Business Case,""Design and Implement," and "Wrap-Up." The Attachments screen 3104 permits documents, spreadsheets, or other files to be attached or otherwise linked to the particular IT project. The Links screen 3108 permits web pages or the like to be linked to the particular IT project. In one example, the Project Summary Information screen 3110 includes a Priority Summary. The Priority Summary permits the user to view current priorities set for the particular IT project in various organizational units. In another example, the Project Summary Information screen 3110 includes an Impact Summary. The Impact Summary permits the user to view a list of items (e.g., applications, application interfaces, application instances, application interface instances, organizational units, business processes, IT services, IT staff, etc.) that are impacted by the particular project.

A user can create a new IT project to be tracked by the system 100, such as by selecting the "Create New Project" button 3112 on the Project Details screen 3100 illustrated in FIG. 31. This permits the user to establish basic project request information about the new project, such as illustrated in the Project Request screen 3102 in FIG. 31.

IT Project Definition Example

After a new IT project has been created, the user can then click on the "Project Definition," button 3114 on the Project Lifecycle screen 3104 to define aspects of the IT project, such as its initial scope and its stakeholders. Defining the initial scope of the IT project allows the user to enter information about the project, such as one or more of the following:

(a) An IT Project Type identifier (e.g., "Application,""Infrastructure," and/or "Other," etc.). In one example, the system 100 includes a predefined list of IT Project types selectable by the user.

(b) An IT Project Initial Scope identifier that classifies the magnitude of the project (e.g., "Large Project,""Medium Project," and/or "Small Project," etc.).

(c) A Justification category that identifies one or more justifications for the project (e.g., "Competitive Advantage,""Increase Revenue,""Sustaining Operations,""Reduce Costs,""Customer Satisfaction,""Regulation Compliance," and/or "Employee Satisfaction," etc.).

Identifying IT project stakeholders allows the user to enter information about the project, such as one or more of the following:

(a) One or more Project Manager identifiers that identify personnel in the organization that are involved in managing the IT project. In one example, a Project Manager identifier identifies such personnel by using a link to the IT Resources data group 204 and/or the IT Staff data group 304.

(b) One or more Business Owner identifiers that identify other personnel in the organization that are affected by the IT project. In one example, a Business Owner identifier identifies such personnel by using a link to the IT Consumers data group 206 and/or the IT Clients data group 310.

(c) One or more Sponsor identifiers that identify one or more executive-level or other advocates for the IT project. In one example, a Sponsor identifier identifies such personnel by using a link to the IT Consumers data group 206 and/or the IT Clients data group 310.

(d) One or more IT Owner identifiers that identify one or more involved personnel from the IT group of the organization. In one example, an IT Owner identifier identifies such personnel by using a link to the IT Resources data group 204 and/or the IT Staff data group 304.

(e) One or more IT Project Approver identifiers that identify one or more personnel with approval authority for the project. In one example, an IT Project Approver identifies such personnel by using a link to the IT Resources data group, the IT Staff data group 304, the IT Consumers data group 206, and/or the IT Clients data group 310.

Business Case Overview

Figure 32:
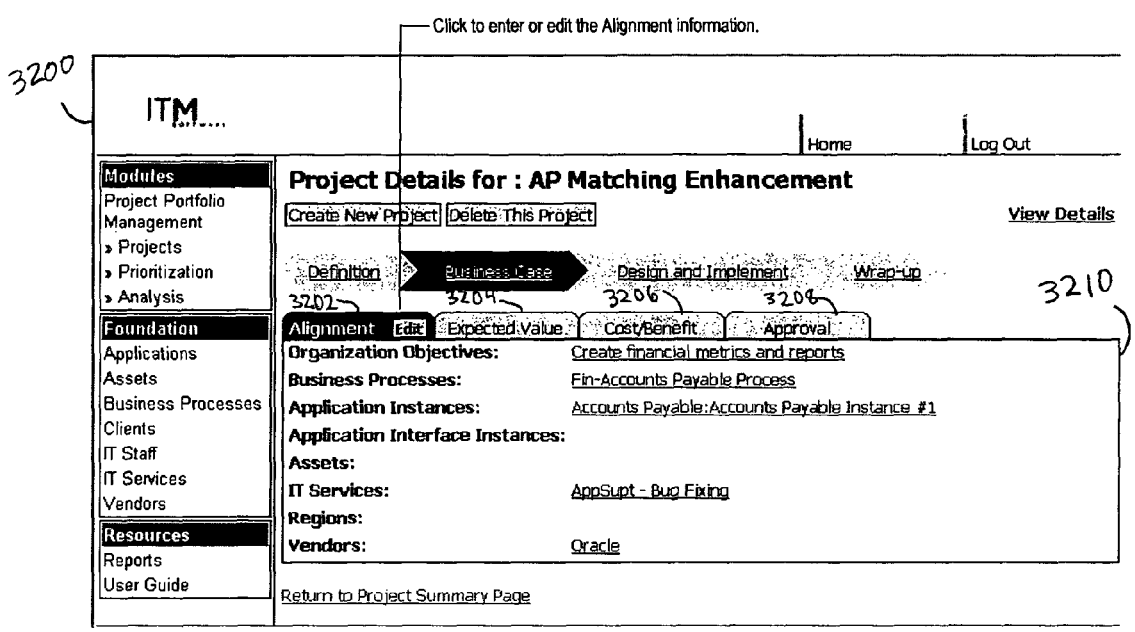
FIG. 32 is a user interface display screenshot illustrating one example of a Business Case screen.

After the IT project has been defined, as discussed above, the user can then click on the "Business Case," button 3116 on the Project Lifecycle screen 3104 to bring up a Business Case screen 3200, as illustrated in the block diagram of FIG. 32. In the example of FIG. 32, the Business Case screen 3200 includes one or more of an "Alignment" button 3202, an "Expected Value" button 3204, a "Cost/Benefit" button 3206, and/or an "Approval" button 3208, each button triggering a corresponding screen pertaining to that aspect of the business case component of the project lifecycle. FIG. 32 illustrates the display of the corresponding Alignment screen 3210, which is obtained by selecting the Alignment button 3202.

Alignment Example

The Alignment component of building a business case for a particular IT project assists the user in determining how well a particular IT project aligns with the organization's business objectives and various other aspects of the organization (for example, without limitation, information in the data groups 200, such as Applications, Business Processes, Vendors, Assets, and/or IT Services, etc.). In one example, the alignment process allows the user to enter and/or use information pertinent to such alignment of a particular project, such as one or more of the following:

(a) One or more Organizational Objectives for the particular IT project, for determining whether the IT project aligns appropriately with organizational objectives. In example, an organizational objective selected for display on the Alignment screen 3210 links to such information in the IT Consumers 206 data group and/or the IT Clients data group 310, as discussed above.

(b) One or more Business Processes affected by the particular IT project. In one example, a business process selected for display on the Alignment screen 3210 links to information in the IT Consumers 206 data group and/or the Business Processes data group 308, as discussed above.

(c) One or more Applications affected by the particular IT project. In one example, an Application selected for display on the Alignment screen 3210 links to information in the IT Resources data group 204 and/or the IT Applications data group 300.

(d) One or more Application Instances affected by the particular IT project. In one example, an Application Instance selected for display on the Alignment screen 3210 links to information in the IT Resources data group 204 and/or the IT Applications data group 300.

(e) One or more Application Interfaces affected by the particular IT project. In one example, an Application Interface selected for display on the Alignment screen 3210 links to information in the IT Resources data group 204 and/or the IT Applications data group 300.

(f) One or more Application Interface Instances affected by the particular IT project. In one example, an Application Interface Instance selected for display on the Alignment screen 3210 links to information in the IT Resources data group 204 and/or the IT Applications data group 300.

(g) One or more IT Assets affected by the particular IT project. In one example, an IT Asset selected for display on the Alignment screen 3210 links to information in the IT Resources data group 204 and/or the IT Assets data group 302.

(h) One or more IT Services affected by the particular IT project. In one example, an IT Service selected for display on the Alignment screen 3210 links to information in the IT Services data group 202.

(i) One or more Regions or locations that are affected by the particular IT project. In one example, a Region selected for display on the Alignment screen 3210 links to information in one or more of the IT Consumers data group 206, the IT Business Processes Data group 308, and/or the IT Clients data group 310.

(j) One or more Vendors that are affected by the particular IT project. In one example, a Vendor selected for display on the Alignment screen 3210 links to information in the IT Resources data group 204 and/or the IT Vendors data group 306.

Expected Value Example

FIG. 33 is a block diagram that illustrates a display of an Expected Value screen 3300, which is obtained by selecting the Expected Value button 3204 on the Business Case screen 3200. In one example, the Expected Value screen 3300 includes a user-editable questionnaire that includes "business value" questions and "probability of success" questions, from which an expected value of the particular IT project can be estimated. As an illustrative example of the type of "business value questions" that may be presented to the user for assisting the user in ascertaining the expected value of the project, FIG. 33 lists five examples of business value questions:

(1) How many organization objectives does this project support?

(2) Will this project enable new functionality that creates a competitive advantage for the company?

(3) Will this project directly impact/improve customer satisfaction?

(4) Is this project driving cost savings versus the current solution?

(5) If driving cost savings, how much savings versus the current solution?

Similarly, FIG. 33 lists two illustrative examples of probability of success questions:

(1) What percentage of employees (or other personnel within the organization) are being impacted by this project?

(2) How many external parties/organizations are impacted by this project?

FIG. 33 merely provides an illustrative example, in practice, the number and nature of the questions may vary. The questions are used to calculate an expected value for a particular project, which may then be compared with and/or analyzed against expected values for other projects In one example of computing the expected value of an IT project, the business value is given a score within a range from 0 to 100, and the probability of success is given a score within a range of 0% to 100%. As an illustrative example, consider an implementation that uses two business value questions, each with "Yes" or "No" answer option buttons defining the value assigned by the user in response to the question.

The system 100 permits the relative importance of each question in a set of questions to be assigned, such as by using a weighting. Continuing with the illustrative example, suppose that Question #1 is allotted a weight of 0.6 (out of 1), because it is considered to have more influence on the Business Value, and suppose that Question #2 is allotted a weight of 0.4 (out of 1).

For each question, the relative importance of each answer (within the set of possible user answers) is defined, such as by giving each answer a score within the context of that particular question (as an illustrative example, for simplicity, assume that a "Yes" answer is assigned a score of 100, and a "No" answer is assigned a score of 0.)

For any project, the business value calculation depends on the answer scores and the weighted values of the questions. Continuing with the above illustrative example:

If the user selects "Yes" for Question #1 and "Yes" for Question #2, the Project's Business Value score=100 and is calculated as follows:

The "Yes" answer for Question #1 contributes a score of 60 to the total Business Value score, calculated as (this answer's score÷maximum score for any answer)*(question weight)*100. In this example, the calculation is (100÷100)*0.6*100=60.

The "Yes" answer for Question #2 contributes a score of 40 to the total Business Value score, calculated as (this answer's score÷maximum score for any answer)*(question weight)*100. In this example, the calculation is (100÷100)*0.4*100=40.

Therefore, the total Business Value score for this illustrative example of Questions and Answers=60+40=100.

If the user selects "Yes" for Question #1 and "No" for Question #2, the Project's Business Value score=100 and is calculated as follows:

The "Yes" answer for Question #1 contributes a score of 60 to the total Business Value score, calculated as (this answer's score÷maximum score for any answer)*(question weight)*100. In this example, the calculation is (100÷100)*0.6*100=60.

The "No" answer for Question #2 contributes a score of 0 to the total Business Value score, calculated as (this answer's score÷maximum score for any answer)*(question weight)*100. In this example, the calculation is (0÷100)*0.4*100=0.

Therefore, the total Business Value score for this illustrative example of Questions and Answers=60+0=60.

If the user selects "No" for Question #1 and "Yes" for Question #2, the Project's Business Value score=40 and is calculated as follows:

The "No" answer for Question #1 contributes a score of 0 to the total Business Value score, calculated as (this answer's score÷maximum score for any answer)*(question weight)*100. In this example, the calculation is (0÷100)*0.6*100=0.

The "Yes" answer for Question #2 contributes a score of 40 to the total Business Value score, calculated as (this answer's score÷maximum score for any answer)*(question weight)*100. In this example, the calculation is (100÷100)*0.4*100=40.

Therefore, the total Business Value score for this illustrative example of Questions and Answers=0+40=100.

Although the above discussion focused on "business value" questions, the "probability of success" questions operate similarly to arrive at a score that is indicative of the probability of success. The probability of success analysis, however, involves a different set of questions that are directed toward the probability of success, rather than the business value, of an IT project, as discussed above. After a Business Value score (BV) and a Probability of Success score (PS) are computed, these scores can be used to compute an "Expected Value" score (EV) of the IT project. In one example, the Expected Value score is computed as EV=BV*PS.

Budget Example

FIG. 34 is a user interface screenshot illustrating an example of a "Budget" screen 3400 that is triggered by selecting the corresponding "Budget" tab on the Business Case screen 3200. The Budget screen 3400 provides budget information about a particular IT project. Among the project-specific budget information that a user can enter and/or use is one or more of the following:

(a) A budget line item name for the budget item (e.g., "desktop-computer," "workstation," or any other user-defined name for the budgeted item."

(b) A budget category for the budget item (e.g., "Hardware," "Software," "IT Staff," etc.). In one example, the user can choose from a list of predefined categories for the budget item.

(c) A budget type for the budget item (e.g., "Project," "Sustaining," etc.).

(d) An assignment of financial responsibility for the budget item (e.g., "IT group," "Business group" etc.).

(e) Budget capital expenditure identifier that characterizes the budget item as a capital expenditure.

(f) Budget expense expenditure identifier that specifies the expense budgeted over one or more calendar quarters.

IT Project Benefit Example

FIG. 35 is a user interface screenshot illustrating an example of a "Benefit" screen 3500 that is triggered by selecting the corresponding "Benefit" tab on the Business Case screen 3200. The Benefit screen 3400 characterizes the benefit of the particular IT project to the organization. For assisting in performing such Benefit characterization, the user can enter and/or use information such as one or more of the following:

(a) A benefit name for the benefit line item.

(b) A benefit category for the benefit line item (e.g., "Tangible,""Intangible," etc.)

(c) A benefit description that stores descriptive information about this benefit line item.

(d) A benefit amount that quantifies the monetary benefit of the project over one or more calendar quarters.

IT Project Approval Example

FIG. 36 is a user interface screenshot illustrating an example of an "Approval" screen 3600 that is triggered by selecting the corresponding "Approval" tab on the Business Case screen 3200. The Approval screen 3400 tracks the approval(s) of the particular IT project by appropriate personnel within the organization. For obtaining such Approval tracking, the user can enter and/or use information such as one or more of the following:

(a) One or more approver names identifying personnel whose approval is needed by the IT Project;

(b) The approval status corresponding to each approver (e.g., "Approved,""Pending,""Denied,""Rejected for Further Work," etc.)

The Approval tracking screen also notes who updated such approval information, and when such information was updated.

Design and Implement Overview

During the project lifecycle, after a project has been defined and the business case has been established, as discussed above, then the IT Project can be designed and implemented. FIG. 37 is a user interface screenshot illustrating an example of a "Design and Implement" screen 3700 that is obtained by selecting the "Design and Implement" button 3118 on the Project Lifecycle screen 3104 of FIG. 31. In one illustrative example, the Design and Implement phase of the Project Lifecycle includes one or more of the following components: a "Schedule" component, an "Allocate Resources" component, and/or an "Actuals" component with corresponding screens obtained by selecting corresponding tabs 3704, 3706, or 3708.

IT Project Scheduling Example

FIG. 37 illustrates a Schedule screen 3702, which is obtained by selecting the Schedule tab 3704 on the Design and Implement screen 3700. Among other things, the Schedule functionality permits the user to track actual and planned dates for each IT project phase, and to modify the outlook (such as a "Schedule Health") of the particular IT project accordingly. In the example illustrated in FIG. 37, the "Schedule" screen tracks phases of the IT project, along with their planned start and end dates, and actual start and end dates. The user can compare these to a displayed "Committed Delivery Date," when completion of the IT project has been promised, and can adjust the Schedule Health of the IT project accordingly. The user can also use the Schedule functionality to define dependencies between different IT projects, such as when a second IT project depends upon the completion of a first IT project, for example.

For using the schedule functionality, the user can enter and/or use information such as one or more of the following:

(a) A committed delivery date that specifies the final delivery date of the particular IT project.

(b) A schedule health indicator that indicates how close the actual dates are to meeting the planned dates on the project schedule for each phase of the project (e.g., "On Schedule, ""Behind Schedule," and/or "Critical," etc.). In one example, a predefined list of schedule health indicator choices are available so that the user can select from the predefined list. The schedule health indicator differentiates between different health statuses, such as by using color-coding, different hatching patterns, or by providing any other distinguishing visual or other indicator.

(c) Any one or more project dependencies of the particular IT project to other IT projects. In one example, any such project dependency creates a link to the other IT project 2900 in the IT projects data group.

(d) Planned start and end dates for the IT project.

(e) Actual start and end dates for the IT project.

(f) Projected Actual End date for the IT project, e.g., to accommodate any schedule adjustments.

Allocate Resources Example

Figure 38:
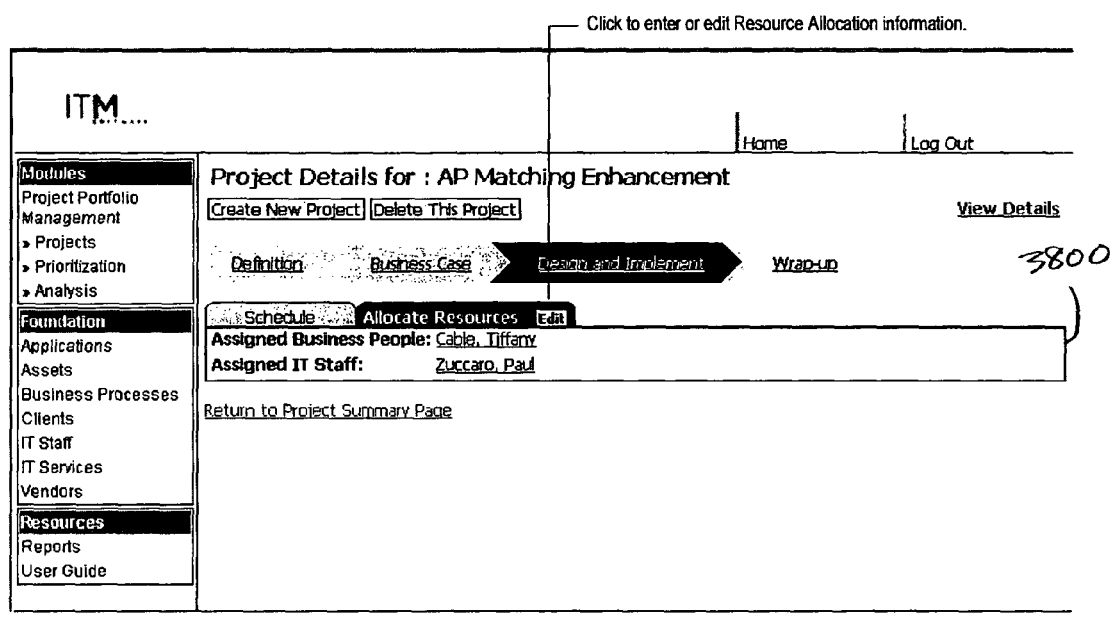
FIG. 38 is a user interface screenshot that illustrates an Allocate Resources screen.

FIG. 38 is a user interface screenshot that illustrates an Allocate Resources screen 3800, which is obtained by selecting the Allocate Resources tab 3706 on the Design and Implement screen 3700 of FIG. 37. Among other things, the Schedule functionality permits the user to assign resources to a particular IT project. For using the allocate resources functionality, the user can enter and/or use information such as one or more of the following:

(a) One or more business person identifiers that identify business personnel in the organization that serve as resources associated with the IT Project. In one example, a business person identifier creates or uses a link to information about such personnel in the IT Consumers data group 206 and/or the IT Clients data group 310.

(b) One or more IT staff identifiers that identify IT staff personnel in the IT group of the organization that serve as resources associated with the IT Project. In one example, an IT staff identifier creates or uses a link to information about such IT personnel in the IT Resources data group 204 or the IT staff data group 304.

(c) Notes that store further information about the particular IT Project and resources for the same.

Tracking Actuals Example

FIG. 39 is a user interface screenshot that illustrates an "Actuals" screen 3900, which is obtained by selecting an Actuals tab 3902 on the Design and Implement screen 3700. The Actuals screen 3900 permits comparison of actual expenditures against the budget expenditures tracked in the Budget screen 3400. For using such Actual expenditure tracking functionality, the user can enter and/or use information such as one or more of the following:

(a) An expenditure line item name that identifies the expenditure.

(b) An expenditure category that categorizes the expenditure (e.g., "Hardware,""Software,""IT Staff," etc.).

(c) An expenditure type that identifies the type of the line item expenditure (e.g., "Project,""Sustaining," etc.).

(d) An expenditure financial responsibility identifier that indicates where financial responsibility for the expenditure lies (e.g., "IT,""Business Unit," etc.).

(e) An expenditure description of the line item expenditure.

(f) An actual capital expenditure identifier that characterizes the expenditure item as a capital expenditure.

(g) An actual expense expenditure identifier that specifies the expense incurred over one or more calendar quarters.

IT Project Wrap-Up Example

During the project lifecycle, after a project has been defined, the business case has been established, and the IT Project has been designed and implemented, as discussed above, then a post-project wrap-up may be appropriate. FIG. 40 is a user interface screenshot illustrating an example of a "Wrap-up" screen 4000 that is obtained by selecting the "Wrap-Up" button 3120 on the Project Lifecycle screen 3104 of FIG. 31. In one illustrative example, the Wrap-Up phase of the Project Lifecycle includes one or more of the following components: a "Client Feedback" component and an "IT Lessons Learned" component, each of which includes a corresponding screen triggered by selecting a corresponding "Client Feedback" tab 4002 or an "IT Lessons Learned" tab 4004.

FIG. 40 is a user interface screenshot that illustrates a Client Feedback screen 4006, which is obtained by selecting the Client Feedback tab 4002 on the Wrap-Up screen 4000. In one example, the Client Feedback screen 4002 includes a user-editable questionnaire that includes questions. In one example, such questions relate to rating satisfaction with the outcome of the IT project and the execution of the IT project, as illustrated in FIG. 40.

FIG. 41 is a user interface screenshot that illustrates an IT Lessons Learned screen 4100, which is obtained by selecting the IT Lessons Learned tab 4004 on the Wrap-Up screen 4000. In one example, the IT Lessons Learned screen 4100 includes a user-editable questionnaire that includes questions relating to the IT project and its execution. As an illustrative example, but not by way of limitation, FIG. 41 poses the following questions:

(1) How clearly defined were the objectives for this project?

(2) How clearly defined were the objectives for your work?

(3) How clear were you on your role in the project?

(4) How adequately involved did you feel in project decisions?

(5) How efficient and effective were project team meetings?

(6) How efficient and effective were technical meetings?

These examples of questions are merely illustrative; the actual number and nature of such questions may vary.

Project Prioritization Example

An example of the PPM screen 3000 with the Projects screen 3010 active was illustrated in FIG. 30. FIG. 42 is a user interface screenshot illustrating an example of the PPM screen 3000 with a Prioritization screen 4200 active, such as by selecting the Prioritization tab on the PPM screen 3000. The example of FIG. 42 illustrates a list of projects filtered by a user-selected Organizational Unit. The projects are listed in order of their priority. In this example, each project listed includes one or more of its priority, its expected value, its name, its state, its total budget expense, its return on investment (ROI), its business value, the date by which its completion is needed, and/or user-navigable related links. The prioritization screen 4200 includes a "Modify Priorities" button 4202 that permits a user to prioritize projects that haven't previously been prioritized, to reprioritize projects, or both.

In one example, the prioritization depends in part on the project state (e.g., projects having a project state such as "Cancelled," or "Completed," are not included in the prioritization).

FIG. 43 is a user interface screenshot illustrating an example of a Priority Summary screen 4300 for a particular IT project (e.g., "AP Matching Report"). In one example, display of the Priority Summary screen 4300 is obtained by selecting a particular one of the projects listed on the Prioritization screen 4200. The Priority Summary screen 4300 lists how a particular IT project has been prioritized by different organizational groups. The illustrative example of FIG. 43 depicts a situation where the project priority in an organizational unit is out of alignment with priority for the same project in its parent organizational unit. More particularly, the priority for the AP Matching Report project in the Accounts Payable organizational unit is 2 out of a total of 2 projects. In the parent Finance organizational unit, the priority for the project is 1 out of a total of 10 projects. Communicating this discrepancy to the individuals responsible for setting priorities in these two organizational units allows them to bring the project's priorities into alignment.

Project Analysis Overview

Figure 44:
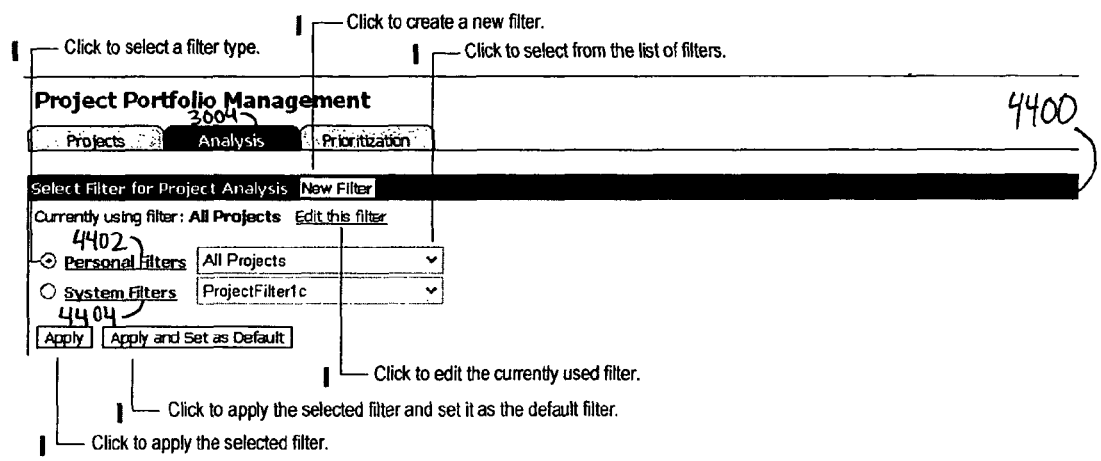
FIG. 44 is a user interface screenshot illustrating an example of an "Analysis" screen

Examples of the PPM screen 3000 with the Projects screen 3010 active and the Prioritization screen 4200 active were illustrated in FIGS. 30 and 42, respectively. FIG. 44 is a user interface screenshot illustrating an example of an "Analysis" screen 4400, the display of which can be triggered, in one example, by selecting the "Analysis" button 3004 on the PPM screen 3000. The Analysis screen 4400, and related functionality, assists the user in assessing the relative value of IT projects that make up the user's portfolio of IT projects. Among other things, the Analysis screen 4400 provides filters that permit the user to view the portfolio of IT projects from different perspectives. This allows the user to concentrate on one or more precise subsets of the portfolio of IT projects. In one example, the filters include Personal filters 4402, defined by the user, and System filters 4404 that are predefined for the user.

Project Filtering Example

FIG. 45 is a user interface screenshot illustrating an example of a "New Filter" screen 4500 that permits the user to enter various filtering parameters for filtering IT projects. In one example, the user-definable filtering options for filtering IT projects includes basic filtering options, financial filtering options, alignment filtering options, and/or clients and IT staff filtering options, such as one or more of the following:

(a) A filter Name that identifies the particular combination of filtering selections.

(b) A filter Description that stores descriptive information about the filter, if desired.

(c) One or more Organizational Units for filtering IT projects. In one example, a specified organizational unit filter parameter links to such information in the IT Consumers data group 206 arid/or the IT Clients data group 310, as appropriate.

(d) One or more Schedule Health parameter values (as discussed above) for filtering IT projects. In one example, a schedule health parameter links to such information in an IT Projects data group 2900.

(e) One or more project State parameter values (as discussed above) for filtering IT projects. In one example, a project state parameter links to such information in an IT Projects data group 2900.

(f) One or more Justification category parameter values (as discussed above) for filtering IT projects. In one example, a justification category parameter links to such information in an IT Projects data group 2900.

(g) A One Time Project Cost range for filtering IT projects according to the one time cost associated with implementing the project.

(h) A Sustaining Cost range for filtering IT projects according to the continuing costs associated with sustaining the project after it has been implemented.

(i) A Total Cost of ownership range for filtering IT projects according to the sum of the project's one time costs and the continuing costs over the life of the implemented IT project. In a further example, the future costs are optionally expressed in terms of a present value of such future costs.

(j) A Total Benefit of ownership range for filtering IT projects according to the benefit expected to be derived over the life of the implemented IT project. In a further example, the future benefits are optionally expressed in terms of a present value of such future benefits.

(k) A Return On Investment (ROI) range for filtering IT projects according to the project's predicted ROI. In one example the ROI for a particular IT project is calculated using information entered about the expected benefit of a project along with information entered about the projected expenditures of the IT project.

(l) One or more Organizational Objective parameter values (as discussed above) for filtering IT projects according to organizational objectives. In one example, an organizational objective parameter links to such information in an IT Consumers data group 206 and/or an IT Clients data group 310.

(m) One or more Business Process parameter values (as discussed above) for filtering IT projects according to business processes of the organization. In one example, a business process parameter links to such information in an IT Consumers data group 206 and/or a Business Processes data group 308.

(n) One or more Application Instance parameter values (as discussed above) for filtering IT projects according to application instances used by the organization in one example, an application instance parameter links to such information in an IT Resources data group 204 and/or an IT Applications data group 300.

(o) One or more Application-Interface Instance parameter values (as discussed above) for filtering IT projects according to application interface instances used by the organization. In one example, an application interface parameter links to such information in an IT Resources data group 204 and/or an IT Applications data group 300.

(p) One or more IT Asset parameter values (as discussed above) for filtering IT projects according to IT assets of the organization. In one example, an IT asset parameter links to such information in an IT Resources data group 204 and/or an IT Assets data group 302.

(q) One or more IT Services parameter values (as discussed above) for filtering IT projects according to IT services provided to or within the organization. In one example, an IT services parameter links to such information in an IT Services data group 202.

(r) One or more Region parameter values (as discussed above) for filtering IT projects according to regions of the organization that are affected by the IT project. In one example, a Region parameter links to information in one or more of the IT Consumers data group 206, the IT Business Processes Data group 308, and/or the IT Clients data group 310.

(s) One or more Vendor parameter values (as discussed above) for filtering IT projects according to vendors that are involved with the IT project. In one example, a Vendor parameter links to information in the IT Resources data group 204 and/or the IT Vendors data group 306.

(t) One or more Project Manager parameter values (as discussed above) for filtering IT projects according to the Project Manager of the IT project. In one example, a Project Manager parameter links to information in the IT Resources data group 204 and/or the IT Staff data group 304.

(u) One or more IT Vendor Owner parameter values (as discussed above) for filtering IT projects according to IT vendor owners responsible for or otherwise associated with the IT vendors that are involved with the IT project. In one example, an IT Vendor Owner parameter links to information in the IT Resources data group 204 and/or the IT Vendors data group 306.

(v) One or more IT Staff parameter values (as discussed above) for filtering IT projects according to IT staff personnel that are assigned to the IT project. In one example, an IT Staff parameter links to information in the IT Resources data group 204 and/or the IT Staff data group 304.

(w) One or more Sponsor parameter values (as discussed above) for filtering IT projects according to an executive or other sponsor of the IT project. In one example, a Sponsor parameter links to information in one or more of the IT Consumers data group 206, the IT Clients data group 310, the IT Resources data group 204, and/or the IT Staff data group 304.

(x) One or more Business Owner parameter values (as discussed above) for filtering IT projects according to Business Owner(s) of the IT project. In one example, a Business Owner parameter links to information in one or more of the IT Consumers data group 206 and/or the IT Clients data group 310.

(y) One or more Business People parameter values for filtering IT projects according to business people assigned to the IT project. In one example, a Business People parameter links to information in one or more of the IT Consumers data group 206 and/or the IT Clients data group 310.

Project Portfolio Value Analysis Example

After the user has performed the desired filtering (if any) of the portfolio of IT projects, the PPM module 2800 then permits the user to display useful information about the filtered subset of IT projects to assist the user in evaluating such IT projects individually and/or in relation to other IT projects.

Figure 46:
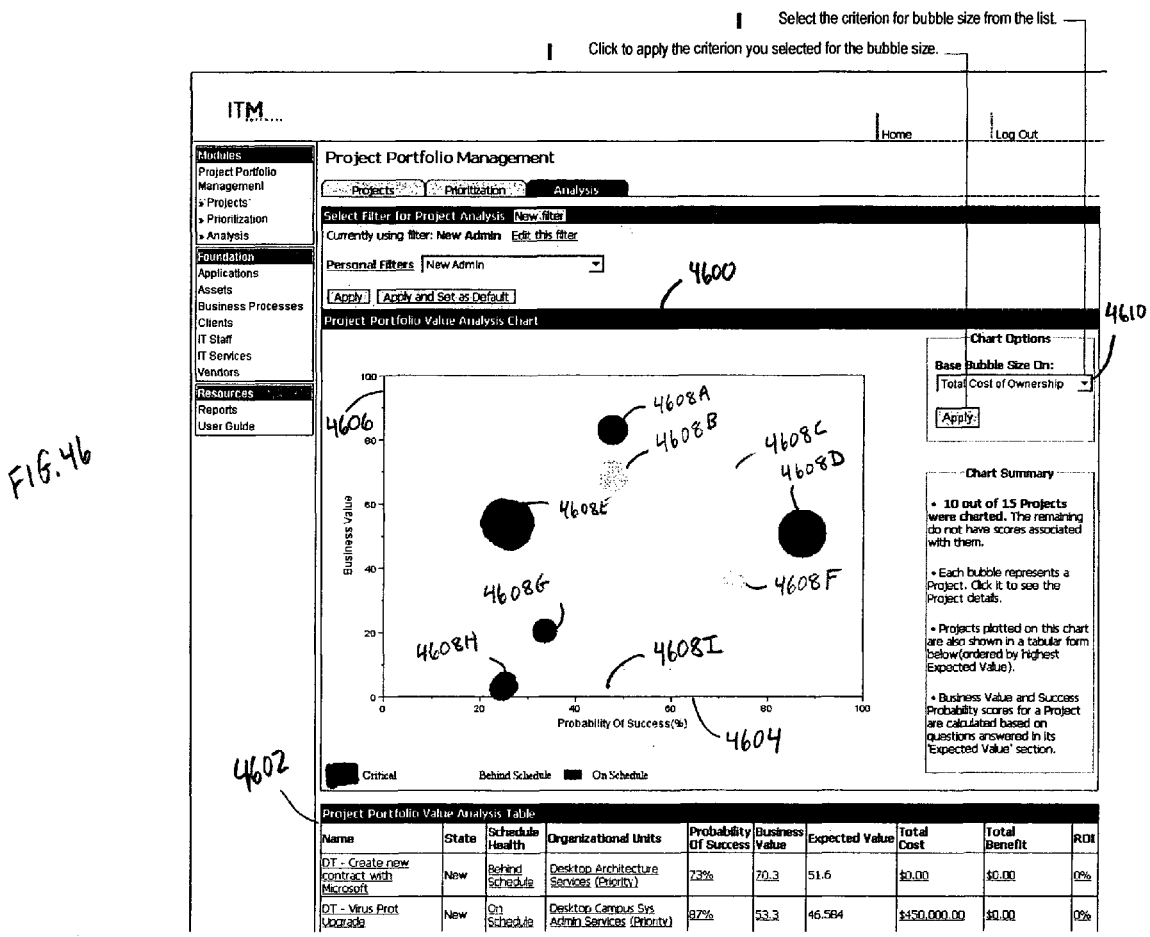
FIG. 46 is a user interface screenshot illustrating an example of a Project Portfolio Value Analysis Chart.

FIG. 46 is a user interface screenshot illustrating an example of a Project Portfolio Value Analysis Chart 4600, which is also presented in tabular form as a Project Portfolio Analysis Table 4602. In the example of FIG. 46, the Project Portfolio Value Analysis Chart 4600 provides a bubble chart indicating an IT Project's "Probability of Success" on its X-axis 4604, and indicating the IT Project's "Business Value," on its Y-axis 4606. Each "bubble" 4608 depicted on the chart 4606 depicts one of the filtered subset of IT projects. Positioning a mouse cursor over a particular bubble 4608 displays identifying information about the IT project represented by that bubble 4608 as well as the X and Y chart values of the particular bubble 4608. Clicking on the particular bubble using the mouse cursor displays the Project Summary screen for that particular IT project, which provides further details about that particular IT project.

In FIG. 46, the chart 4606 includes a bubble size control parameter 4610 that permits the user to determine what the size of the bubbles 4608 represents. In the example illustrated in FIG. 46, bubble size represents the "Total Cost of Ownership" of the IT project, as discussed above. In one example, the bubble size control parameter 4610 is selected from a drop-down list that includes various predefined bubble size control parameter values, such as one or more of: a Total Budget Expense, Planned Expense, Planned Capital Expense, Actual Expense, Actual Capital Expense, Return on Investment (ROI), and/or Total Benefit. In one example, the bubbles 4606 are also color coded, such as to represent the schedule health (discussed above) of the particular IT project.

The location of the bubbles 4608 on the chart 4600 is determined from the "Probability of Success" and the "Business Value" scores of the IT project. In one example, such scores are obtained, in turn, using answers to expected value and cost/benefit questions in the "Business Case" portion of the project's lifecycle, as discussed above. The location of the bubbles 4608 on the chart 4600 provides guidance to the user for deciding whether to continue individual projects. Bubbles 4608 appearing in the upper right quadrant of the chart 4600 represent both a high business value and a high probability of success, and should likely therefore be pursued. Bubbles 4608 appearing in the lower left quadrant of the chart 4600 represent both a low business value and a low probability of success, and should likely therefore be re-evaluated to determine how to make such projects more attractive. Bubbles 4608 appearing in either the upper left quadrant of the chart 4600 or the lower right quadrant of the chart 4600 have a low probability of success or a low business value, respectively. Therefore, such projects should likely be reviewed by the portfolio manager.

The Project Portfolio Value Analysis Table 4602 displays information about the same filtered subset of IT projects that are displayed on the chart 4600. In the example of FIG. 46, the information provided about each listed IT project includes one or more of the project name, the project state, the schedule health of the project, the organizational units associated with the project, the probability of success of the project, the business value of the project, the expected value of the project, the total cost of the project, the total benefit of the project, and/or the ROI of the project.

Reporting Example

In addition to the reporting already discussed above, the PPM module 2800 also provides project-specific filtering and reporting, such as one or more of the following predefined reports (e.g., in addition to customized reports generated by the user):

(a) a Projects by Objective Report that sorts IT projects according to the organizational objective(s) associated with the project, and generates a report about the same.

(b) a Projects by Importance Report that sorts IT projects according to their importance. In one example, the importance is determined using the Expected Value score (EV), discussed above.

(c) A Project Details Report that provides detailed information about each IT project.

It is to be understood that the above description is intended to be illustrative, and not restrictive. For example, the above-described embodiments (and/or aspects thereof) may be used in combination with each other. As another example, portions of the disclosed methods can be encoded into instructions residing on a computer-readable medium. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first,""second," and "third," etc. are used merely as labels, and are not intended to impose numerical requirements on their objects.

What is claimed is:

1. A method of managing information technology (IT) for an organization, the method comprising:
   receiving and storing information in a computer-implemented relational database; and
   organizing the information in data groups in the computer-implemented relational database, the data groups comprising:
      an information technology (IT) services data group, the IT services data group including information about an IT service provided to an organization;
      an IT resources data group, the IT resources data group including information about an IT resource of the organization used to provide the IT service;
      an IT consumers data group, the IT consumers data group including information about an IT consumer within the organization that receives the IT service, the information about an IT consumer including organizational identifiers that identify organizational units within the organization; and
      an IT projects data group, the IT projects data group including information about at least one IT project of the organization, the information about at least one IT project of the organization including an IT project identifier that identifies each IT project, a plurality of priorities for the at least one IT project, wherein each priority of the plurality of priorities is associated with a different organizational unit;
   linking information from each data group to information in the other data groups including linking the at least one IT project to each organizational unit associated with the at least one IT project using the IT project identifier and the organizational identifiers; and
   implementing at least one IT enterprise management function using the information from the IT services data group, from the IT resources data group, from the IT consumers data group, and from the IT projects data group including,
      generating a report for display that provides the plurality of priorities for the at least one IT project that have been prioritized by the different organizational units associated with the at least one IT project based on the linked IT project to each associated organizational unit and the plurality of priorities including displaying a priority for the at least one IT project by a particular organizational unit relative to a total number of IT projects pertaining to that organizational unit.

2. The method of claim 1, wherein the implementing the at least one IT enterprise management function includes displaying an inventory of the at least one IT project of the organization using the database.

3. The method of claim 1, wherein the implementing the at least one IT enterprise management function includes filtering the at least one IT project of the organization using the database.

4. The method of claim 1, wherein the implementing the at least one IT enterprise management function includes analyzing the at least one IT project of the organization using the database.

5. The method of claim 1, wherein the implementing the at least one IT enterprise management function includes receiving and storing information from a user for defining an IT project using the database.

6. The method of claim 5, in which the defining the IT project includes at least one of defining an initial scope for the IT project and identifying any stakeholders in the IT project.

7. The method of claim 5, wherein the implementing the at least one IT enterprise management function includes receiving and storing information from a user for creating a business case for the IT project using the database.

8. The method of claim 7, in which the creating the business case for the IT project includes at least one of:
   determining an alignment of the IT project;
   determining an expected value of the IT project;
   determining a cost/benefit of the IT project; and
   tracking approval of the IT project.

9. The method of claim 7, wherein the implementing the at least one IT enterprise management function includes tracking design and implementation of the IT project using the database.

10. The method of claim 9, wherein the implementing the at least one IT enterprise management function includes receiving and storing information from the user for wrapping up the IT project, including storing in the database at least one of client feedback and lessons learned about the IT project.

11. The method of claim 5, wherein the implementing the at least one IT enterprise management function includes receiving and storing information from the user for creating a budget for the IT project using the database.

12. The method of claim 11, wherein the implementing the at least one IT enterprise management function includes tracking actual expenditures for the IT project against the budget for the IT project using the database.

13. The method of claim 5, wherein the implementing the at least one IT enterprise management function includes receiving and storing information from a user for scheduling the IT project using the database.

14. The method of claim 5, wherein the implementing the at least one IT enterprise management function includes receiving and storing information from the user for allocating resources to the IT project using the database.

15. The method of claim 5, wherein the implementing the at least one IT enterprise management function includes determining a business value of the IT project and a probability of success of the IT project.

16. The method of claim 5, wherein the implementing the at least one IT enterprise management function includes displaying at least one of cost/benefit information, return on investment information, and business value information for at least one of the IT projects to assist the user in prioritizing the at least one of the IT projects relative to other IT projects in the organization.

17. The method of claim 5, wherein the implementing the at least one IT enterprise management function includes displaying IT projects on a chart of business value vs. probability of success.

18. The method of claim 17, wherein the implementing the at least one IT enterprise management function includes representing each IT project on the chart by a bubble.

19. The method of claim 18, wherein the IT enterprise management function includes adjusting a size of the bubble to represent at least one of a total budget expense and a total cost of ownership.

20. The method of claim 1, wherein the implementing the at least one IT enterprise management function includes:
   defining at least one IT project, including storing in a computer database information regarding at least one of a type of the IT project, at least one justification of the IT project, and at least one stakeholder in the IT project; and
   defining a business case for the IT project, including computing an expected value for the IT project using user-input regarding a business value of the IT project and a probability of success of the IT project, and storing the computed expected value for the IT project in the database.

21. The method of claim 20, in which the computing the expected value includes multiplying a business value score by a probability of success score.

22. The method of claim 20, further comprising determining an impact of the IT project by using a stored link between the IT project and at least one of a business process, an application instance, an application interface instance, an organizational unit, an IT service, an IT staff member, a region/location, and an IT vendor.

23. The method of claim 20, in which the defining the business case for the IT project includes creating an association in the database between the IT project and at least one organizational objective.

24. The method of claim 20, in which the defining the business case for the IT project includes creating an association in the database between the IT project and an quantified expected benefit of the IT project.

25. The method of claim 20, further comprising creating an association in the database between the IT project and information about an approval of the IT project.

26. The method of claim 20, further comprising creating an association in the database between the IT project and information about at least one of a schedule for the IT project, a resource allocation for the IT project, and any actual expenditures for the IT project.

27. The method of claim 26, further comprising storing in the database schedule information for the IT project, wherein the schedule information comprises at least one of a delivery date, a schedule health indicator, any dependencies to another IT project, planned start and end dates, and actual start and end dates.

28. The method of claim 20, further comprising creating an association in the database between the IT project and at least one of stored client feedback information and stored lessons learned information.

29. The method of claim 1, wherein the implementing the at least one IT enterprise management function includes:
   retrieving from a computer-implemented database and displaying names of IT projects;
   retrieving from the database and displaying a priority, corresponding to an individual one of the IT projects;
   retrieving from the database and displaying an expected value, corresponding to an individual one of the IT projects, the expected value calculated from a business value and a probability of success; and
   if any user input regarding prioritization is received, then computing a prioritization of the IT projects using the user input and storing the prioritization in the database.

30. The method of claim 29, further comprising retrieving from the database and displaying an activity state corresponding to an individual one of the IT projects.

31. The method of claim 29, further comprising retrieving from the database and displaying a total budget expense corresponding to an individual one of the IT projects.

32. The method of claim 29, further comprising retrieving from the database and displaying a total benefit corresponding to an individual one of the IT projects.

33. The method of claim 29, further comprising retrieving from the database and displaying a return on investment corresponding to an individual one of the IT projects.

34. The method of claim 29, further comprising retrieving from the database and displaying a business value score corresponding to an individual one of the IT projects, the business value score computed using user input in response to questions related to the business value of the IT project.

35. The method of claim 29, further comprising retrieving from the database and displaying a date by which an individual one of the IT projects is needed.

36. The method of claim 1, wherein the implementing the at least one IT enterprise management function includes:
receiving user input specifying a filtering of the IT projects according to at least one of any organizational units associated with the IT projects, any schedule health indicators associated with the IT projects, and any justification category associated with the IT projects; and
filtering the IT projects, for display to the user, using the user input.

37. The method of claim 36, in which the receiving user input further includes receiving user input specifying filtering according to a value range associated with at least one of an IT project one-time cost, an IT project sustaining cost, an IT project total cost that factors in both the IT project one-time cost and the IT project sustaining cost, an IT project benefit, and an IT project return on investment (ROI).

38. The method of claim 1, wherein the implementing the at least one IT enterprise management function includes:
receiving user input specifying a filtering of the IT projects according to at least one of any organizational objectives associated with the IT projects, any business processes associated with the IT projects, any software application instances associated with the IT projects, any hardware assets associated with the IT projects, any IT services associated with the IT projects, any regions associated with the IT projects, and any vendors associated with the IT projects; and
filtering the IT projects, for display to the user, using the user input.

39. The method of claim 1, wherein the implementing the at least one IT enterprise management function includes:
receiving user input specifying a filtering of the IT projects according to at least one of any project managers associated with the IT projects, any IT owners associated with the IT projects, any assigned IT staff associated with the IT projects, any executive sponsors associated with the IT projects, any business owners associated with the IT projects, and any assigned business people associated with the IT projects; and
filtering the IT projects, for display to the user, using the user input.

40. The method of claim 1, wherein the implementing the at least one IT enterprise management function includes:
computing a business value score for the IT projects;
computing a probability of success score for the IT projects; and
displaying graphical indicators of the IT projects on a chart of business value vs. probability of success.

41. The method of claim 40, further comprising adjusting a visual characteristic of the graphical indicator of a particular IT project to represent a total cost of ownership of the IT project.

42. The method of claim 40, further comprising adjusting a visual characteristic of the graphical indicator of a particular IT project to represent a Total Budget Expense.

43. The method of claim 40, further comprising adjusting a visual characteristic of the graphical indicator of a particular IT project to represent a Planned Expense.

44. The method of claim 40, further comprising adjusting a visual characteristic of the graphical indicator of a particular IT project to represent a Planned Capital Expense.

45. The method of claim 40, further comprising adjusting a visual characteristic of the graphical indicator of a particular IT project to represent an Actual Expense.

46. The method of claim 40, further comprising adjusting a visual characteristic of the graphical indicator of a particular IT project to represent an Actual Capital Expense.

47. The method of claim 40, further comprising adjusting a visual characteristic of the graphical indicator of a particular IT project to represent a Return on Investment (ROI).

48. The method of claim 40, further comprising adjusting a visual characteristic of the graphical indicator of a particular IT project to represent a Total Benefit.

49. The method of claim 40, further comprising adjusting a visual characteristic of the graphical indicator of a particular IT project to represent a schedule health of the IT project.

50. The method of claim 40, further comprising displaying details of a particular IT project upon a user-selection of the graphical indicator representing that particular IT project.

* * * * *